United States Patent
Sun et al.

(10) Patent No.: US 11,811,670 B2
(45) Date of Patent: Nov. 7, 2023

(54) PACKET DELAY PARAMETER OBTAINING METHOD, SYSTEM, AND APPARATUS

(71) Applicant: HUAWEI TECHNOLOGIES CO., LTD., Guangdong (CN)

(72) Inventors: Haiyang Sun, Beijing (CN); Yan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 218 days.

(21) Appl. No.: 17/485,169

(22) Filed: Sep. 24, 2021

(65) Prior Publication Data

US 2022/0014475 A1 Jan. 13, 2022

Related U.S. Application Data

(63) Continuation of application No. PCT/CN2020/081574, filed on Mar. 27, 2020.

(30) Foreign Application Priority Data

Apr. 1, 2019 (CN) .......................... 201910258555.9

(51) Int. Cl.
*H04L 12/823* (2013.01)
*H04L 47/32* (2022.01)
(Continued)

(52) U.S. Cl.
CPC .............. *H04L 47/32* (2013.01); *H04L 12/14* (2013.01); *H04L 67/14* (2013.01); *H04W 28/0236* (2013.01); *H04W 28/0268* (2013.01)

(58) Field of Classification Search
CPC ......... H04L 47/32; H04L 12/14; H04L 67/14; H04L 43/0858; H04L 41/5029;
(Continued)

(56) References Cited

U.S. PATENT DOCUMENTS

2009/0262645 A1 10/2009 Laulainen
2019/0059067 A1 2/2019 Lee et al.
(Continued)

FOREIGN PATENT DOCUMENTS

| CN | 101567793 A | 10/2009 |
| CN | 103688570 A | 3/2014 |
| CN | 107040942 A | 8/2017 |

OTHER PUBLICATIONS

Ericsson, NPL Document, "TS 23.503: Session Binding" (Year: 2018).*

(Continued)

*Primary Examiner* — Mewale A Ambaye

(74) *Attorney, Agent, or Firm* — Paul Christopher Hashim

(57) ABSTRACT

A packet delay parameter obtaining method, apparatus, and system are provided. The method provides a session management network element determines whether a first QoS flow satisfying a parameter condition exists, where the first parameter indicates information corresponding to a PSA UPF transmitting the first QoS flow, the first parameter indicating information corresponding to a PSA UPF transmitting the first service flow. If no first QoS flow satisfying the parameter condition exists, a second QoS flow for the first service flow is established, and the session management network element sends a first message to an access network element, the first message including identification information of the second QoS flow and a packet delay parameter corresponding to the second QoS flow.

20 Claims, 9 Drawing Sheets

(51) Int. Cl.
*H04L 12/14* (2006.01)
*H04L 67/14* (2022.01)
*H04W 28/02* (2009.01)

(58) Field of Classification Search
CPC ......... H04W 28/0236; H04W 28/0268; H04W 28/10; H04W 28/02
See application file for complete search history.

(56) References Cited

U.S. PATENT DOCUMENTS

| | | | |
|---|---|---|---|
| 2022/0086218 A1* | 3/2022 | Sabella | H04M 15/66 |
| 2022/0124560 A1* | 4/2022 | Yeh | H04W 28/26 |
| 2022/0263788 A1* | 8/2022 | Lee | H04L 61/4541 |

OTHER PUBLICATIONS

Huawei, NPL Document, Influence of additional non-standardized QoS parameters on QoS (Year: 2018).*
Ericsson, NPL Document, "TS 23.503: Session Binding" (Year: 2017).*
SA WG2 Meeting #124,S2-171055, Influence of additional non-standardized QoS parameters on QoS Flow Binding, Huawei, HiSilicon, Jan. 22 Jan. 26, 2018, Gothenburg, Sweden,total 7 pages.
Huawei, HiSilicon, Solution for Key Issue #6: Division of E2E PDB. SA WG2 Meeting 129#BIS, Nov. 26-30, 2018, West Palm Beach, Florida, S2-1813132, 3 pages.
SA WG2 Meeting #S2-121,S2-173798,Binding mechanism in 5G policy framework ,Ericsson, May 15 May 19, Hangzhou, China,total 4 pages.
3GPP Ts 23.501 V16.0.0 (Mar. 2019), 3rd Generation Partnership Project; Technical Specification Group Services and System Aspects; System Architecture for the 5G System; Stage 2(Release 16), 318 pages.
3GPP TSG-CT WG3 Meeting #99,C3-187221,Control of QoS parameters for default QoS Flow,Huawei,West Palm Beach, U.S.A., Nov. 26-30, 2018 ,total 26 pages.
Qualcomm Incorporated, New solutions for Key Issue #6: Division of E2E PDB. SA WG2 Meeting #130, Jan. 21-25, 2019, Kochi, India,S2-1900488, 2 pages.
3GPP TS 23.502 V16.0.0 (Mar. 2019), 3rd Generation Partnership Project; Technical Specification Group Services and System Aspects; Procedures for the 5G System; Stage 2(Release 16), 420 pages.
SA WG2 Meeting #123,S2-177748,TS 23.503: Session binding,Ericsson,23 Oct. 27, 2017, Ljubljana, Slovenia, total 2 pages.
Ericsson, LG Electronics, Evaluation of Solution #17 and Solution#16 for KI#3. 3GPP SA WG2 Meeting #130, Jan. 21-25, 2019, Kochi, India, S2-1900692, 5 pages.
3GPP TS 23.503 V16.0.0 (Mar. 2019), 3rd Generation Partnership Project; Technical Specification Group Services and System Aspects; Policy and Charging Control Framework for the 5G System; Stage 2(Release 16), 84 pages.
3GPP TSG-SA2 Meeting #127bis,S2-185604,QoS flow binding for URLLC services,CATT, Huawei,Newport Beach, United States, May 28, 2018-Jun. 1, 2018,total 2 pages.

* cited by examiner

US 11,811,670 B2

PACKET DELAY PARAMETER OBTAINING METHOD, SYSTEM, AND APPARATUS

CROSS-REFERENCE TO RELATED APPLICATIONS

This application is a continuation of International Patent Application No. PCT/CN2020/081574, filed on Mar. 27, 2020, which claims priority to Chinese Patent Application No. 201910258555.9, filed on Apr. 1, 2019. The disclosures of the aforementioned applications are hereby incorporated by reference in their entireties.

TECHNICAL FIELD

This application relates to the communications field, and more specifically, to a packet delay parameter obtaining method, system, and apparatus.

BACKGROUND

In a 5th generation (5G) system, to ensure end-to-end quality of service of a service, a 5G quality of service (QoS) model based on a quality of service flow is proposed. The 5G QoS model supports a guaranteed bit rate QoS flow (GBR QoS flow) and a non-guaranteed bit rate QoS flow (Non-GBR QoS flow). Same transmission processing (such as scheduling or an admission threshold) is performed on service flows controlled by a same QoS flow. A terminal device may establish one or more protocol data unit (PDU) sessions with a 5G network. One or more QoS flows may be established in each PDU session. Each QoS flow is identified by a QoS flow identifier (QFI), and the QFI uniquely identifies a QoS flow in a session. In addition, each QoS flow corresponds to one data radio bearer (DRB), and a DRB may correspond to one or more QoS flows. Whether a QoS flow is a GBR QoS flow or a non-GBR QoS flow is determined by a corresponding QoS profile (QoS profile).

In a conventional technology, a session management function (SMF) may manage a plurality of protocol data unit session anchor user plane functions (PSA UPFs). However, different PSA UPFs may be deployed in different locations. In this case, remaining scheduling duration of packets from the different PSA UPFs is different on a RAN side. If an existing manner is used, a distinguishment cannot be made between the remaining scheduling duration of the packets from the different PSA UPFs on the radio access network (RAN) side.

SUMMARY

In view of this, this application provides a packet delay parameter obtaining method, apparatus, and system, to help an access network element distinguish between packet delay parameters of service flows transmitted by different PSA UPFs.

According to a first aspect, a packet delay parameter obtaining method is provided, including: A session management network element determines whether a first quality of service QoS flow satisfying a parameter condition exists. The parameter condition means that a first parameter of the first QoS flow is identical to a first parameter of a first service flow, the first parameter of the first QoS flow is used to indicate information corresponding to a protocol data unit session anchor PSA user plane function UPF transmitting the first QoS flow, and the first parameter of the first service flow is used to indicate information corresponding to a PSA UPF transmitting the first service flow. If no first QoS flow satisfying the parameter condition exists, the session management network element establishes a second QoS flow for the first service flow, and sends a first message to an access network element. The first message includes identification information of the second QoS flow and a packet delay parameter corresponding to the second QoS flow, so that the access network element learns the packet delay parameter of the second QoS flow. Herein, for all service flows transmitted by different PSA UPFs, the session management network element can perform the foregoing operations, so that the access network element can obtain packet delay parameters of the service flows transmitted by the different PSA UPFs. This helps the access network element distinguish between packet delay parameters of different service flows.

In a possible implementation, the first parameter is a packet delay parameter, and correspondingly, the parameter condition means that a packet delay parameter of the first QoS flow is identical to a packet delay parameter of the first service flow. Therefore, the session management network element can determine, based on a packet delay parameter, whether a QoS flow satisfying a parameter condition exists. This helps the access network element distinguish between packet delay parameters of different service flows.

Optionally, the packet delay parameter is a protocol data unit session anchor radio access network PSA-RAN packet delay budget PDB. Alternatively, the packet delay parameter may be understood as information used by the access network element to determine a PSA-RAN PDB.

In another possible implementation, the first parameter includes a data network access identifier DNAI, and correspondingly, the parameter condition means that a DNAI of the first QoS flow is identical to a DNAI of the first service flow. Optionally, the first parameter may further include another existing binding parameter. In other words, the first parameter may include the DNAI and the another existing binding parameter. Therefore, the session management network element can determine, based on the first parameter, whether a QoS flow satisfying a parameter condition exists. This helps the access network element distinguish between packet delay parameters of different service flows.

In still another possible implementation, before the session management network element determines whether the first quality of service QoS flow satisfying the parameter condition exists, the method further includes: When a first PSA UPF is inserted, the session management network element determines the first parameter of the first service flow. The first PSA UPF is configured to transmit the first service flow. Therefore, when a new PSA UPF is inserted, the session management network element can determine the first parameter (for example, the first parameter is a PSA-RAN PDB), and an obtaining manner is comparatively flexible.

In yet another possible implementation, before the session management network element determines whether the first quality of service QoS flow satisfying the parameter condition, the method further includes: The session management network element receives a policy and charging control PCC rule of the first service flow from a policy control network element. The PCC rule includes the first parameter of the first service flow. The session management network element obtains the first parameter of the first service flow according to the PCC rule. Therefore, the session management network element can obtain the first parameter (for example, the first parameter includes the DNAI) from the received PCC rule, and an obtaining manner is comparatively flexible.

Optionally, the method further includes: If the first QoS flow satisfying the parameter condition exists, the session management network element binds the first service flow to the first QoS flow for transmission. Therefore, if the first QoS flow satisfying the parameter condition exists, the session management network element can bind the first service flow to the first QoS flow, and does not need to create a new QoS flow. In other words, a PSA-RAN PDB of the first QoS flow is a PSA-RAN PDB of the first service flow.

According to a second aspect, a packet delay parameter obtaining method is provided, including: A session management network element determines a first packet delay parameter. The first packet delay parameter is the largest in a plurality of packet delay parameters, and the plurality of packet delay parameters are packet delay parameters of service flows that are simultaneously transmitted in a same quality of service QoS flow by a plurality of protocol data unit session anchor PSA user plane functions UPFs. The session management network element sends the first packet delay parameter to an access network element, that is, the session management network element sends a longest upper time limit to the access network element, to ensure a latency requirement of a service flow.

In a possible implementation, the method further includes: The session management network element determines whether the first packet delay parameter is updated. If the first packet delay parameter is updated, the session management network element sends an updated first packet delay parameter to the access network element. Therefore, when a new PSA UPF is inserted or a cell handover occurs on UE, the session management network element can send the updated packet delay parameter to the access network element.

Optionally, the packet delay parameter is a protocol data unit session anchor radio access network PSA-RAN packet delay budget PDB.

According to a third aspect, a packet delay parameter obtaining system is provided, including: a session management network element, configured to: determine whether a first quality of service QoS flow satisfying a parameter condition exists, where the parameter condition means that a first parameter of the first QoS flow is identical to a first parameter of a first service flow, the first parameter of the first QoS flow is used to indicate information corresponding to a protocol data unit session anchor PSA user plane function UPF transmitting the first QoS flow, and the first parameter of the first service flow is used to indicate information corresponding to a PSA UPF transmitting the first service flow; and if no first QoS flow satisfying the parameter condition exists, establish a second QoS flow for the first service flow; and an access network element, configured to receive a first message from the session management network element, where the first message includes identification information of the second QoS flow and a packet delay parameter corresponding to the second QoS flow. Herein, for all service flows transmitted by different PSA UPFs, the session management network element can perform the foregoing operations, so that the access network element can obtain packet delay parameters of the service flows transmitted by the different PSA UPFs. This helps the access network element distinguish between packet delay parameters of different service flows.

In a possible implementation, when a first PSA UPF is inserted, the session management network element is further configured to determine the first parameter of the first service flow. The first PSA UPF is configured to transmit the first service flow. Therefore, when a new PSA UPF is inserted, the session management network element can determine the first parameter (for example, the first parameter is a PSA-RAN PDB), and an obtaining manner is comparatively flexible.

In another possible implementation, the session management network element is further configured to: receive a policy and charging control PCC rule of the first service flow from a policy control network element, where the PCC rule includes the first parameter of the first service flow; and obtain the first parameter of the first service flow according to the PCC rule. Therefore, the session management network element can obtain the first parameter (for example, the first parameter includes a DNAI) from the received PCC rule, and an obtaining manner is comparatively flexible.

According to a fourth aspect, a packet delay parameter obtaining system is provided, including: a session management network element, configured to determine a first packet delay parameter, where the first packet delay parameter is the largest in a plurality of packet delay parameters and the plurality of packet delay parameters are packet delay parameters of service flows that are simultaneously transmitted in a same quality of service QoS flow by a plurality of protocol data unit session anchor PSA user plane functions UPFs; and an access network element, configured to receive the first packet delay parameter from the session management network element, that is, the access network element sends a longest upper time limit to the access network element, to ensure a latency requirement of a service flow.

In a possible implementation, the method further includes: The session management network element determines whether the first packet delay parameter is updated. If the first packet delay parameter is updated, the session management network element sends an updated first packet delay parameter to the access network element. Therefore, when a new PSA UPF is inserted or a cell handover occurs on UE, the session management network element can send the updated packet delay parameter to the access network element.

Optionally, the packet delay parameter is a protocol data unit session anchor radio access network PSA-RAN packet delay budget PDB.

According to a fifth aspect, a communications apparatus is provided. The apparatus may be a session management network element, or may be a chip in a session management network element. The apparatus has a function of implementing the session management network element in any one of the aspects or any possible implementation of any one of the aspects. The function may be implemented by hardware, or may be implemented by hardware executing corresponding software. The hardware or the software includes one or more modules corresponding to the foregoing functions.

According to a sixth aspect, an apparatus is provided. The apparatus includes a processor, a memory, and a transceiver. The processor is connected to the memory and the transceiver. The memory is configured to store an instruction, the processor is configured to execute the instruction, and the transceiver is configured to communicate with another network element under control of the processor. When the processor executes the instruction stored in the memory, the execution enables the apparatus to perform the method performed by the session management network element in any one of the aspects or any possible implementation of any one of the aspects. It should be noted that the memory may be integrated into the processor, or may be independent of the processor.

According to a seventh aspect, an apparatus is provided. The apparatus includes a processor and a transceiver. The processor is connected to the transceiver. The processor is configured to execute an instruction. The transceiver is configured to communicate with another network element under control of the processor. When the processor executes the instruction, the execution enables the apparatus to perform the method performed by the session management network element in any one of the aspects or any possible implementation of any one of the aspects.

According to an eighth aspect, a computer-readable storage medium is provided. The computer-readable storage medium stores a program, and the program enables a session management network element to perform the method performed by the session management network element in any one of the aspects or any possible implementation of the aspects.

According to a ninth aspect, a communications chip is provided. The communications chip stores an instruction. When the instruction is run on a computer device, the communications chip is enabled to perform the method in any one of the aspects or any possible implementation of the aspects.

According to a tenth aspect, a computer program product including an instruction is provided. When the instruction is run on a computer, the computer is enabled to perform the method in any one of the aspects or any possible implementation of the aspects.

DESCRIPTION OF EMBODIMENTS

Figure 1:
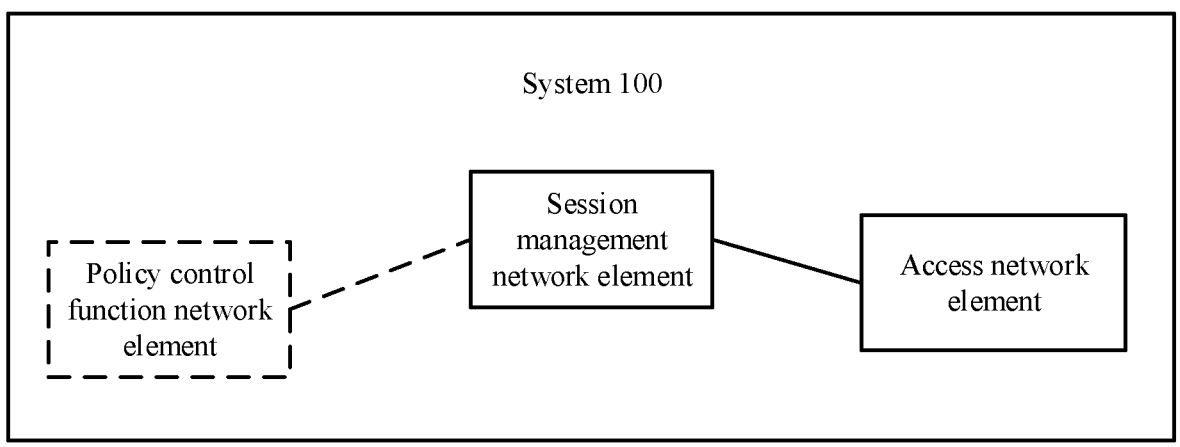
FIG. 1 is a schematic diagram of a system architecture to which an embodiment of this application is applied.

The following describes technical solutions of this application with reference to accompanying drawings.

The technical solutions of the embodiments of this application may be applied to any communications system, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future 5th generation (5G) system, or a new radio (NR) system.

Devices or network elements that may be used in the embodiments of this application are described herein.

A terminal in the embodiments of this application may be user equipment (UE), an access terminal, a terminal in V2X communication, a subscriber unit, a subscriber station, a mobile station, a mobile console, a remote station, a remote terminal, a mobile device, a user terminal, a terminal device, a wireless communications device, a user agent, a user apparatus, or the like. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application. The terminal may alternatively include a V2X device, for example, a vehicle or an on-board unit (OBU) in a vehicle.

The terminal in the embodiments of this application is connected to a radio access network (RAN) device in a wireless manner. A radio access network element is connected to a core network device in a wireless or wired manner. The core network device and the radio access network element may be different independent physical devices, a function of the core network device and a logical function of the radio access network element may be integrated into one physical device, or some functions of the core network device and some functions of the radio access network element may be integrated into one physical device. The terminal may be located in a fixed location, or may be mobile.

For example, the core network device includes a mobility management entity (MME) or a broadcast/multicast service center (BMSC), or may include a corresponding functional entity in a 5G system, for example, a core network control plane (CP) or user plane (UP) network function such as a session management function (SMF) or an access and mobility management function AMF. The core network control plane may also be understood as a core network control plane function (CPF) entity.

FIG. 1 is a schematic diagram of a system architecture to which an embodiment of this application is applied. As shown in FIG. 1, the system 100 includes a session management network element and an access network element. The system 100 may be configured to perform a packet delay parameter obtaining method in the embodiments of this application. Optionally, the system 100 may further include a policy control network element.

In a first implementation, the session management network element is configured to determine whether a first quality of service QoS flow satisfying a parameter condition exists, where the parameter condition means that a first parameter of the first QoS flow is identical to a first parameter of a first service flow, the first parameter of the first QoS flow is used to indicate information corresponding to a protocol data unit session anchor PSA user plane function UPF transmitting the first QoS flow, and the first parameter of the first service flow is used to indicate information corresponding to a PSA UPF transmitting the first service flow; and if no such first QoS flow satisfying the parameter condition exists, establish a second QoS flow for the first service flow. The access network element is configured to receive a first message from the session management network element. The first message includes identification information of the second QoS flow and a packet delay parameter corresponding to the second QoS flow.

In the first implementation, the session management network element is further configured to: when inserting a first anchor UPF, determine the first parameter of the first service flow. The first anchor UPF is configured to transmit the first service flow.

In the first implementation, the session management network element is further configured to receive a policy and charging control PCC rule of the first service flow from the policy control network element, where the PCC rule includes the first parameter of the first service flow; and obtain the first parameter of the first service flow according to the PCC rule.

In a second implementation, the session management network element is configured to determine a first packet delay parameter. The first packet delay parameter is the largest in a plurality of packet delay parameters, and the plurality of packet delay parameters are packet delay parameters of service flows that are simultaneously transmitted in a same QoS flow by a plurality of protocol data unit session anchor PSA user plane functions UPFs. The access network element is configured to receive the first packet delay parameter from the session management network element.

It should be noted that the session management network element, the access network element, and the policy control network element in FIG. 1 are merely names, and the names do not constitute a limitation to the devices. For example, the session management network element may be referred to as a session management functional entity, or may be referred to as a session management function or the like. The policy control network element may be referred to as a policy control functional entity, or may be referred to as a policy control function or the like. This is not specifically limited in this embodiment of this application.

The session management network element mainly includes the following functions related to a session, for example, session management (such as session establishment, modification, and release, including maintenance of a tunnel between a UPF and an AN), UPF selection and control, service and session continuity (SSC) mode selection, and roaming.

The policy control function network element mainly includes the following functions related to a policy, for example, formulating a unified policy, providing policy control, and obtaining, from a UDR, subscription information related to a policy decision.

The access network element is an access device through which UE is connected to the mobile communications system in a wireless manner. The access network element may be a NodeB NodeB, an evolved NodeB eNodeB, a gNodeB (gNB) in a 5G mobile communications system, a base station in a future mobile communications system, an access node in a wireless fidelity (WiFi) system, or the like. The access network element may alternatively be a radio controller in a cloud radio access network (CRAN) scenario.

Alternatively, the access network device may be a relay station, an access point, a vehicle-mounted device, a wearable device, a network device in a future 5G network, a network device in a future evolved PLMN network, or the like. A specific technology and a specific device form that are used for the radio access network device are not limited in this embodiment of this application.

It should be understood that unified description is provided herein. If the foregoing network elements appear in the following, the foregoing descriptions of the functions included in the network elements is also applicable, and details are not described again when the network elements appear next time.

In a 5G network and another future network, the session management network element, the access network element, and the policy control network element may also have other names. This is not specifically limited in this embodiment of this application. For example, the session management network element may also be replaced by a session management function SMF, the access network element may also be replaced by a radio access network RAN, the policy control network element may also be replaced by a policy control function (PCF), and the like. Unified description is provided herein, and details are not described below.

Optionally, the session management network element and the policy control network element in the system 100 each may be an independent network element, may be jointly implemented by a plurality of network elements, or may be used as a functional module in a network element. This is not specifically limited in this embodiment of this application.

It may be understood that the foregoing functions may be network elements in a hardware device, may be software functions running on dedicated hardware, or may be virtualized functions instantiated on a platform (for example, a cloud platform).

Optionally, the system 100 shown in FIG. 1 may be applied to the 5G network and another possible future network. This is not specifically limited in this embodiment of this application.

The system 100 shown in FIG. 1 is applied to the 5G network. As shown in FIG. 2, FIG. 3, FIG. 4, FIG. 5, or FIG. 6, for example, the session management network element may be a session management function SMF (which may be an H-SMF or a V-SMF) in 5G, the policy control function network element may be a policy control function PCF (which may be an H-PCF or a V-PCF) in 5G, and the access network element may be a RAN in 5G.

Figure 2:
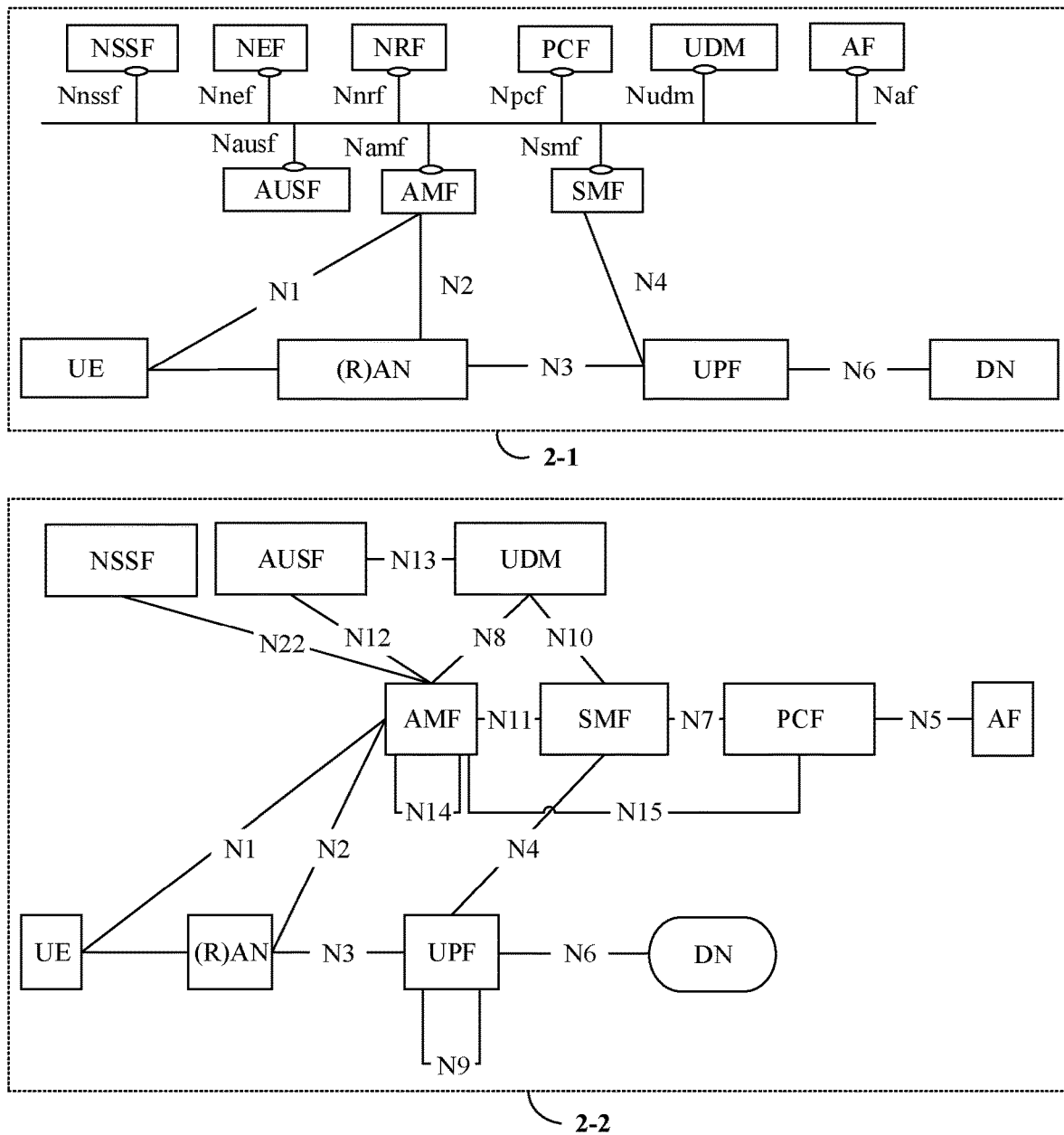
FIG. 2 is a schematic diagram of a 5G architecture in a non-roaming scenario to which an embodiment of this application is applied.

For example, assuming that the system in FIG. 1 is applied to a 5G architecture in a non-roaming scenario, as shown in FIG. 2, the session management network element in FIG. 1 may be an SMF in FIG. 2, the policy control function network element in FIG. 1 may be a PCF in FIG. 2, and the access network element in FIG. 1 may be a RAN in FIG. 2. FIG. 2 is a diagram of a non-roaming architecture to which an embodiment of this application is applied. FIG. 2 includes a non-roaming architecture 2-1 based on a service-oriented interface and a non-roaming architecture 2-2 based on a reference point. The architecture 2-1 specifically includes a network slice selection function (NSSF), an authentication server function (AUSF), unified data management (UDM), a network exposure function (NEF), a network repository function (NRF), a policy control function device (PCF), an application function (AF), an access and mobility management function (AMF), an SMF, user equipment UE, a radio access network RAN, a user plane function UPF, and a data network (DN).

The NSSF may be understood as a name of a network slice selection function network element in a 5G architecture. The network slice selection function network element mainly includes the following functions: selecting a group of network slice instances for the UE, determining allowed NSSAI, determining an AMF set that can serve the UE, and the like.

The AUSF may be understood as a name of an authentication server function network element in the 5G architecture. The authentication server function network element mainly includes the following functions: an authentication server function, interaction with a unified data management network element to obtain user information, and implementation of an authentication-related function, for example, generating an intermediate key.

The UDM may be understood as a name of a unified data management network element in the 5G architecture. The unified data management network element mainly includes the following functions: unified data management, authentication credential processing in a 3GPP authentication and key agreement mechanism, user identity processing, access authorization, registration and mobility management, subscription management, short message service management, and the like.

The NEF may be understood as a name of a network exposure function network element in the 5G architecture. The network exposure function network element mainly includes the following functions: securely opening a service and a capability that are provided by a 3GPP network function, such as internally opening or opening to a third party; and converting or translating information exchanged with an AF and information exchanged with an internal network function, such as an AF service identifier and internal 5G core network information such as a data network name (DNN), and single network slice selection assistance information (S-NSSAI).

The NRF may be understood as a name of a network repository function network element in the 5G architecture. The network repository function network element mainly includes the following functions: a service discovery function, an NF text for maintaining an available network function instance, and a service supported by the network repository function network element.

The AF may be understood as a name of an application function network element in the 5G architecture. The application function network element mainly includes the following functions: interacting with a 3GPP core network to provide a business or a service, including interacting with an NEF, interacting with a policy architecture, and the like.

The AMF may be understood as a name of a mobility management network element in the 5G architecture. The mobility management network element includes the following functions related to access and mobility, for example, connection management, mobility management, registration management, access authentication and authorization, reachability management, and security context management.

The UPF may be understood as a name of a user plane function network element in the 5G architecture. The user plane function network element includes the following functions related to a user plane, for example, packet routing and transmission, packet detection, service usage reporting, QoS processing, lawful interception, uplink packet detection, and downlink packet storage.

It should be understood that unified description is provided herein. If the foregoing network elements appear in the following architecture, the foregoing description of the functions included in the network elements is also applicable. For brevity, details are not described again when the network elements appear next time.

A person skilled in the art may learn from FIG. 2 that a control plane function of the architecture 201 performs communication through a service-oriented interface. For example, as shown in the architecture 2-1 in FIG. 2, a service-oriented interface provided by the NSSF to an external device may be Nnssf, a service-oriented interface provided by the NEF to an external device may be Nnef, a service-oriented interface provided by the NRF to an external device may be Nnrf, and a service-oriented interface provided by the AMF to an external device may be Namf; a service-oriented interface provided by the SMF to an external device may be Nsmf; a service-oriented interface provided by the UDM to an external device may be Nudm, and a service-oriented interface provided by the AF to an external device may be Naf; a service-oriented interface provided by the PCF to an external device may be Npcf, and a service-oriented interface provided by the AUSF to an external device may be Nausf; interfaces between the control plane function and the RAN and between the control plane function and the UPF are non service-oriented interfaces. The UE is connected to the AMF through an interface N1, and the UE is connected to the RAN by using a radio resource control (RRC) protocol. The RAN is connected to the AMF through an interface N2, and the RAN is connected to the UPF through an interface N3. The UPF is connected to the DN through an interface N6. In addition, for related descriptions of the connection between the UPF and the SMF through an interface N4, refer to a 5G system architecture in the 23501 standard. For brevity, a connection relationship of the architecture 201 is not described herein.

The architecture 2-2 specifically includes an NSSF, an AUSF, a UDM, an AMF, an SMF, a PCF, an AF, UE, a RAN, a UPF, and a DN. In the architecture 202, the UE is connected to the AMF through an interface N1, and the UE is connected to the RAN by using a radio resource control (RRC) protocol. The RAN is connected to the AMF through an interface N2, and the RAN is connected to the UPF through an interface N3. The UPF is connected to the DN through an interface N6, and the UPF is connected to the SMF through an interface N4. The SMF is connected to the PCF through an interface N7, the SMF is connected to the UDM through an interface N10, and the SMF is connected to the AMF through an interface N11. The AMF is connected to the UDM through an interface N8, the AMF is connected to the AUSF through an interface N12, the AMF is connected to the NSSF through an interface N22, and the AMF is connected to the PCF through an interface N15. The AMF and the SMF obtain user subscription data from the UDM through the interfaces N8 and N10, respectively, and obtain policy data from the PCF through the interfaces N15 and N7, respectively. The AUSF is connected to the UDM through the interface N13. The AF is connected to the PCF through the interface N5. The SMF controls the UPF through the interface N4.

Figure 3:
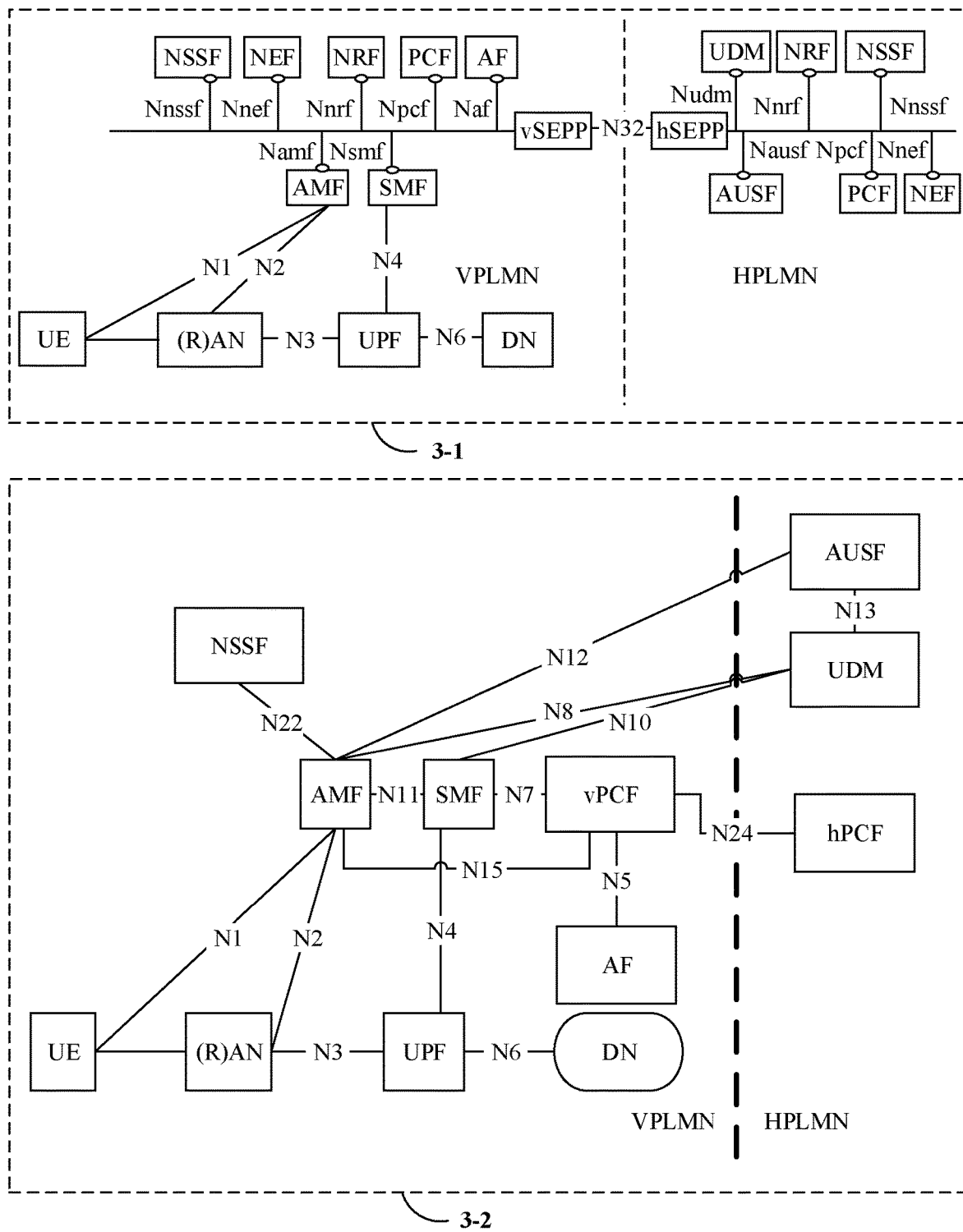
FIG. 3 is a schematic diagram of a 5G architecture in a local breakout roaming scenario to which an embodiment of this application is applied.

For example, assuming that the system in FIG. 1 may be applied to a local breakout (local breakout) roaming architecture, as shown in FIG. 3, the session management network element in FIG. 1 may be an SMF in FIG. 3, the policy control function network element in FIG. 1 may be a visited policy control function (v-PCF) (or referred to as a PCF on a VPLMN side or V-PCF) or a home policy control function (h-PCF) (or a PCF on an HPLMN side or H-PCF) in FIG. 3, and the access network element in FIG. 1 may be a RAN in FIG. 3. FIG. 3 is a diagram of an architecture of local breakout (local breakout) roaming to which an embodiment of this application is applied. FIG. 3 includes an architecture 3-1 of local routing roaming based on a service-oriented interface and an architecture 3-2 of local routing roaming based on a reference point. A difference between the architecture in FIG. 3 and the architecture in FIG. 2 lies in that: The architecture 3-1 in FIG. 3 includes user equipment UE, a radio access network RAN, a data network (DN), a control plane network element on a visited public land mobile communications network (VPLMN) side, and a network element on a home public land mobile communications network (HPLMN) side. In the architecture 3-1, the control plane network element on the VPLMN side includes an NSSF, an NEF, an NRF, a PCF, an AF, an AMF, a UPF, an SMF, and a visited security edge protection agent (vSEPP). The network element on the HPLMN side includes a UDM, an NRF, an NSSF, an AUSF, a PCF, an NEF, and a home security edge protection agent (hSEPP).

Similar to the architecture 2-1 in FIG. 2, in the architecture 3-1, a control plane function performs communication through a service-oriented interface. A service-oriented interface provided by the NSSF to an external device may be Nnssf, a service-oriented interface provided by the NEF to an external device may be Nnef, a service-oriented interface provided by the NRF to an external device may be Nnrf, and a service-oriented interface provided by the AMF to an external device may be Namf; a service-oriented interface provided by the SMF to an external device may be Nsmf; a service-oriented interface provided by the UDM to an external device may be Nudm, and a service-oriented interface provided by the AF to an external device may be Naf; a service-oriented interface provided by the PCF to an external device may be Npcf, and a service-oriented interface provided by the AUSF to an external device may be Nausf. In addition, the vSEPP in the architecture 3-1 is used for information filtering, policy control, and topology hiding of an internal control plane interface of the VPLMN. The hSEPP in the architecture 3-1 is used for information filtering, policy control, and topology hiding of an internal control plane interface of the HPLMN. The vSEPP is connected to the hSEPP through an interface N32 (N32 for short). For all related descriptions, refer to a 5G system architecture (5G system architecture) in the standard 23501. Details are not described herein.

The architecture 3-2 specifically includes an NSSF, an AUSF, a UDM, an AMF, an SMF, a PCF (including a VPCF on a VPLMN side and an hPCF on an HPLMN side), an AF, UE, a RAN, a UPF, and a DN. In the architecture 3-2, the UE is connected to the AMF through an interface N1, and the UE is connected to the RAN by using a radio resource control (RRC) protocol. The RAN is connected to the AMF through an interface N2, and the RAN is connected to the UPF through an interface N3. The UPF is connected to the DN through an interface N6, and the UPF is connected to the SMF through an interface N4. The SMF is connected to the V-PCF through an interface N7, the SMF is connected to the UDM through an interface N10, and the SMF is connected to the AMF through an interface N11. The AMF is connected to the UDM through an interface N8, and the AMF is connected to the V-PCF through an interface N15. The AMF and the SMF obtain user subscription data from the UDM through the interfaces N8 and N10, respectively, and obtain policy data from the V-PCF through the interfaces N15 and N7, respectively. The AF is connected to the V-PCF through an interface N5. The SMF controls the UPF through the interface N4. The V-PCF is connected to an H-PCF through an interface N-24. The NSSF is connected to the AMF through an interface N22. The AUSF is connected to the AMF through an N12 interface, and is connected to the UDM through an interface N13.

Figure 4:
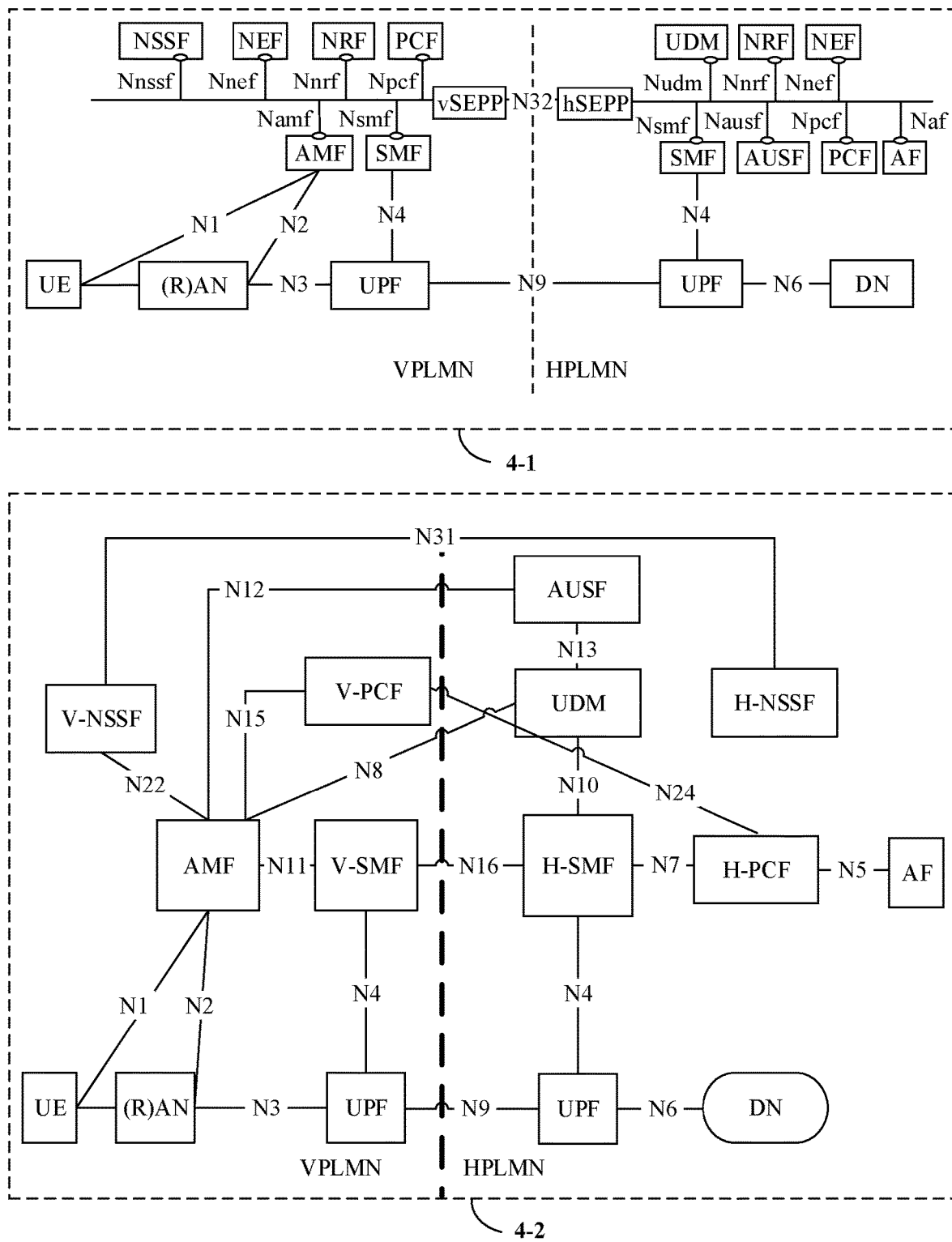
FIG. 4 is a schematic diagram of a 5G architecture in a home routed roaming scenario to which an embodiment of this application is applied.

For example, assuming that the system in FIG. 1 may be applied to a home routed (home routed) roaming architecture, as shown in FIG. 4, the session management network element in FIG. 1 may be an SMF (to be specific, an SMF on a VPLMN side or an SMF on an HPLMN side) in FIG. 4, the policy control function network element in FIG. 1 may be a v-PCF (or a PCF on the VPLMN side) or an h-PCF (or a PCF on the HPLMN side) in FIG. 4, and the access network element in FIG. 1 may be a RAN in FIG. 4. FIG. 4 is a diagram of a home routed roaming architecture to which an embodiment of this application is applied. FIG. 4 includes an architecture 4-1 of home routed roaming based on a service-oriented interface and an architecture 4-2 of home routed roaming based on a reference point.

The architecture 4-1 includes user equipment UE, a radio access network RAN, a data network DN, a control plane network element on a VPLMN side, and a network element on an HPLMN side. In the architecture 401, the control plane network element on the VPLMN side includes an NSSF, an NEF, an NRF, a PCF, an AMF, a UPF, an SMF, and a vSEPP. The control plane network element on the HPLMN side includes a UDM, an hSEPP, an NSSF, an AUSF, a PCF, an AF, and an NEF. In the architecture 4-1, a control plane function performs communication with each other through a service-oriented interface. A service-oriented interface provided by the NSSF to an external device may be Nnssf, a service-oriented interface provided by the NEF to an external device may be Nnef, a service-oriented interface provided by the NRF to an external device may be Nnrf, and a service-oriented interface provided by the AMF to an external device may be Namf; a service-oriented interface provided by the SMF to an external device may be Nsmf; a service-oriented interface provided by the UDM to an external device may be Nudm, and a service-oriented interface provided by the AF to an external device may be Naf; a service-oriented interface provided by the PCF to an external device may be Npcf, and a service-oriented interface provided by the AUSF to an external device may be Nausf. In addition, the visited security edge protection agent vSEPP in the architecture 4-1 is used for information filtering, policy control, topology hiding, and the like of an internal control plane interface of the VPLMN. The home security edge protection proxy hSEPP in the architecture 4-1 is used for information filtering, policy control, topology hiding, and the like of an internal control plane interface of the HPLMN. The vSEPP is connected to the hSEPP through an interface N32 (N32 for short). For all related descriptions, refer to a 5G system architecture in the standard 23501. Details are not described herein.

The architecture 4-2 includes user equipment UE, a radio access network RAN, a data network DN, a control plane network element on a VPLMN side, and a control plane network element on an HPLMN side. In the architecture 402, the control plane network element on the VPLMN side includes a V-NSSF, a V-PCF, an AMF, a UPF, and a V-SMF, and the control plane network element on the HPLMN side include a UDM, an H-NSSF, an AUSF, an H-PCF, an AF, and a UPF. In the architecture 402, the UE is connected to the AMF through an interface N1, and the UE is connected to the RAN by using an RRC protocol. The RAN is connected to the AMF through an interface N2, and the RAN is connected to the UPF through an interface N3. On the HPLMN side, the UPF is connected to the DN through an interface N6, and the UPF is connected to the H-SMF through an interface N4. On the HPLMN side, the H-SMF is connected to the H-PCF through an interface N7, and the H-SMF is connected to the UDM through an interface N10. On the VPLMN side, the V-SMF is connected to the AMF through an interface N11; the AMF is connected to the UDM through an interface N8, and the AMF is connected to the V-PCF through an interface N15. The AMF and the H-SMF obtain user subscription data from the UDM through the interfaces N8 and N10, respectively. The AMF obtains policy data from the V-PCF through an interface N15. The AF is connected to the H-PCF through the interface N5. The V-SMF or H-SMF controls the UPF through the interface N4. The UPF on the HPLMN side is connected to the UPF on the VPLMN side through an interface N9. The V-PCF is connected to an H-PCF through an interface N-24. The V-NSSF is connected to the AMF through an interface N22. The H-NSSF is connected to the V-NSSF through an interface N31. The AUSF is connected to the AMF through an N12 interface, and is connected to the UDM through an interface N13.

The technical solutions in the embodiments of this application are mainly applied to a scenario of a UPF that supports a single PDU session and a plurality of PDU session anchors (PSA): To support selective routing of service traffic to the DN network, or to ensure session continuity, the SMF may control a data path of a PDU session. In this way, the PDU session may correspond to a plurality of interfaces N6 simultaneously. UPFs that terminate these interfaces are referred to as UPFs that support a PDU session anchor function (namely, PSA UPFs). Each anchor of the PDU session provides a different access to the same DN. Further, the first PDU session anchor used when the PDU session is established is associated with an SSC mode of the PDU session. Other anchors of the PDU session, for example, selectively route traffic to the DN, are irrelevant to the SSC mode of the PDU session.

The "selectively route traffic to the DN" may be implemented in the following manner: For example, some traffic is selected, and can be forwarded, through an interface N6, to an AN that is closer to provide a service to the UE. For example, an uplink classifier functionality (UL CL) may be used for a PDU session, or IPv6 multi-homing may be used for a PDU session. A main difference between the uplink classifier functionality and the IPv6 multi-homing lies in that a plurality of IPv6 prefixes are assigned to the UE in an IPv6 multi-homed session. That is, the UE can be aware of existence of a plurality of PSA UPFs, which is not supported in a UL CL scenario.

The UL CL is described in detail herein. The UL CL is a function provided by the UPF, and is intended to (locally) transfer some services by using a flow filter provided by the SMF. For a PDU session of an IPv4, IPv6, IPv4v6, or Ethernet type, the SMF may insert an uplink classifier (UL Classifier) into a data path of the PDU session. The SMF may determine to add (or referred to as insert) or remove a UPF that supports a UL CL, and the SMF performs control through a common interface N4 and by using a capability of the UPF. The SMF may insert, during or after session establishment, the UPF that supports the UL CL, or remove the UL CL after session establishment. The SMF may insert, into a data path of a PDU session, a plurality of UPFs that support UL CL. The UE is unaware of traffic transfer caused by the UL CL, and does not participate in addition or removal of the UL CL. In scenario of a PDU session of an IPv4, IPv6, or IPv4v6 type, the UE associates the PDU session with a single IPv4 address, a single IPv6 prefix, or both. After the UL CL is inserted into the data path, there are a plurality of PDU session anchors for a PDU session. These anchors provide different access to the same DN. Only one of the plurality of PDU session anchors is an anchor of an IPv4 address and/or an IPv6 prefix assigned to the UE in the PDU session.

It should be noted that a data forwarding mechanism on a reference point N6 between different PDU session anchors that provide local access and DN access is not within the scope of this protocol.

With the UL CL, an uplink service is forwarded to different PDU session anchors, and downlink services sent to the UE are aggregated, that is, services from different PDU session anchors are aggregated to a downlink toward the UE. These rules are based on service detection and forwarding rules provided by the SMF.

For the UL CL, a filtering rule (for example, checking a destination IP address/prefix of an uplink IP packet) is used, and then how to route the packet is determined. The UPF that supports the UL CL can also be configured by the SMF to support functions such as charging, rate control (session-AMBR level), and lawful interception.

The UPF that supports the UL CL may alternatively be used as a PDU session anchor for connecting to an LADN (for example, a tunnel of the interface N6 or a NAT) (or may be understood that the UPF is used as an anchor UPF connecting to the DN when the UE is in an LADN location area).

In addition, more UL CLs (corresponding to more PDU session anchors) may be inserted into the data path, to create a new data path for the same PDU session. A method for organizing data paths of all UL CL in a PDU session depends on a carrier's configuration and logic of the SMF, and only one UPF (UPF that supports the UL CL) can connect to the (R)AN through the interface N3.

Figure 5:
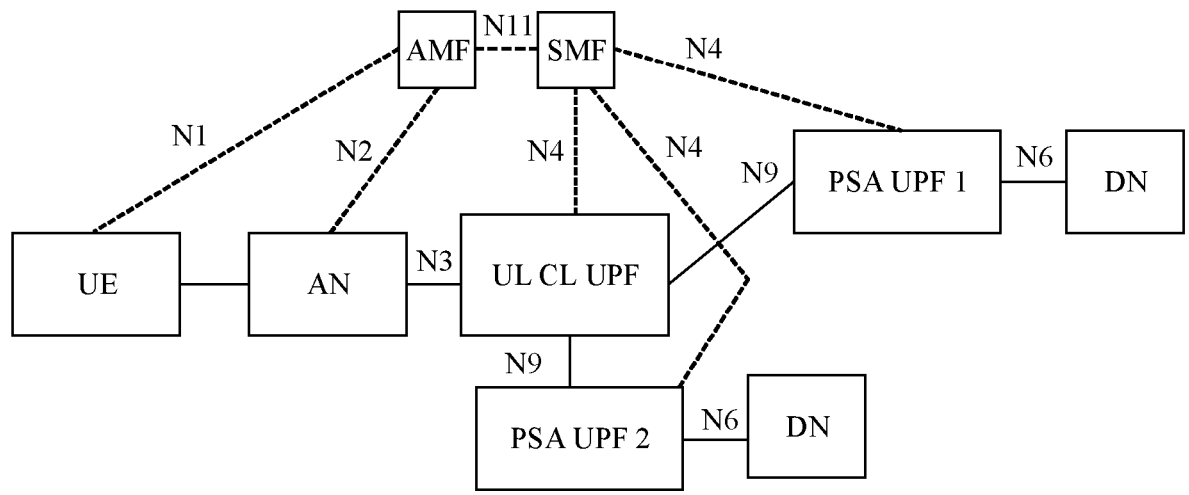
FIG. 5 is a schematic diagram of a user plane architecture of an uplink classifier.

FIG. 5 shows an architecture in which a function of an uplink classifier is used in a PDU session. As shown in FIG. 5, UE, an AN, an AMF, an SMF, a UPF, and a DN are included. The UPF specifically includes a UL CL UPF (namely, a UPF having a function of an uplink classifier), a PSA UPF 1, and a PSA UPF 2. The PSA UPFs are UPFs that support a PDU session anchor function. The UE is connected to the AMF through an interface N1. The AN is connected to the AMF through an interface N2, and is connected to the UL CL UPF through an interface N3. The AMF is connected to the SMF through an interface N11. The UL CL UPF is connected to the SMF through an interface N4, and is connected to the PSA UPF 1 and the PSA UPF 2 through interfaces N9. The SMF is connected to the PSA UPF 1 and the PSA UPF 2 through interfaces N4. The PSA UPF 1 is connected to the DN through an interface N6. The PSA UPF 1 is connected to the DN through an interface N6.

An IPv6 multi-homing function is described in detail herein. IPv6 multi-homing means a PDU session can be associated with a plurality of IPv6 prefixes. The PDU session associated with the plurality of IPv6 prefixes is referred to as a multi-homed PDU session. The multi-homed PDU session can access the DN through a plurality of PDU session anchors. A user plane path is branched at a common UPF toward different PDU session anchors. The UPF that supports this function is referred to as a branching point (branching point). The branching point forwards an uplink service to the different PDU session anchors, and aggregates downlink services to the UE, that is, the branching point aggregates services from the different PDU session anchors to a downlink toward the UE.

The UPF that supports the function of the branching point may also be configured by the SMF to support functions such as charging, rate control (session-AMBR level), and lawful interception. The SMF can determine to add (insert) or remove, by using a general-purpose interface N4 and a UPF capability, a UPF supporting a function of a branching point. The SMF may insert, during or after session establishment, the UPF that supports the function of the branching point function. Alternatively, the SMF may remove, after session establishment, the UPF that supports the function of the branching point function.

Multi-homing is applicable only to IPv6 PDU sessions. When the UE requests an IPv4v6 or IPv6 PDU session, the UE needs to inform a network whether the supports a multi-homed IPv6 PDU session. The use of the plurality of IPv6 prefixes in the PDU session has the following characteristics: (1) The SMF configures the UPF that supports the function of the branching point, so that the UPF can separate service traffic between IP anchors based on source IP address prefixes (the source IP prefixes may be selected by the UE based on routing information and network configuration preferences). (2) Routing information and preferences in the UE are configured by using IETF RFC 4191, to affect selection of a source prefix. It should be noted that this corresponds to a scenario 1 "IPv6 Multi-homing without Network Address Translation" in RFC 7157. This can ensure that a branching point is unaware of a routing table of a data network and maintains a first-hop routing function at an IP anchor.

Figure 6:
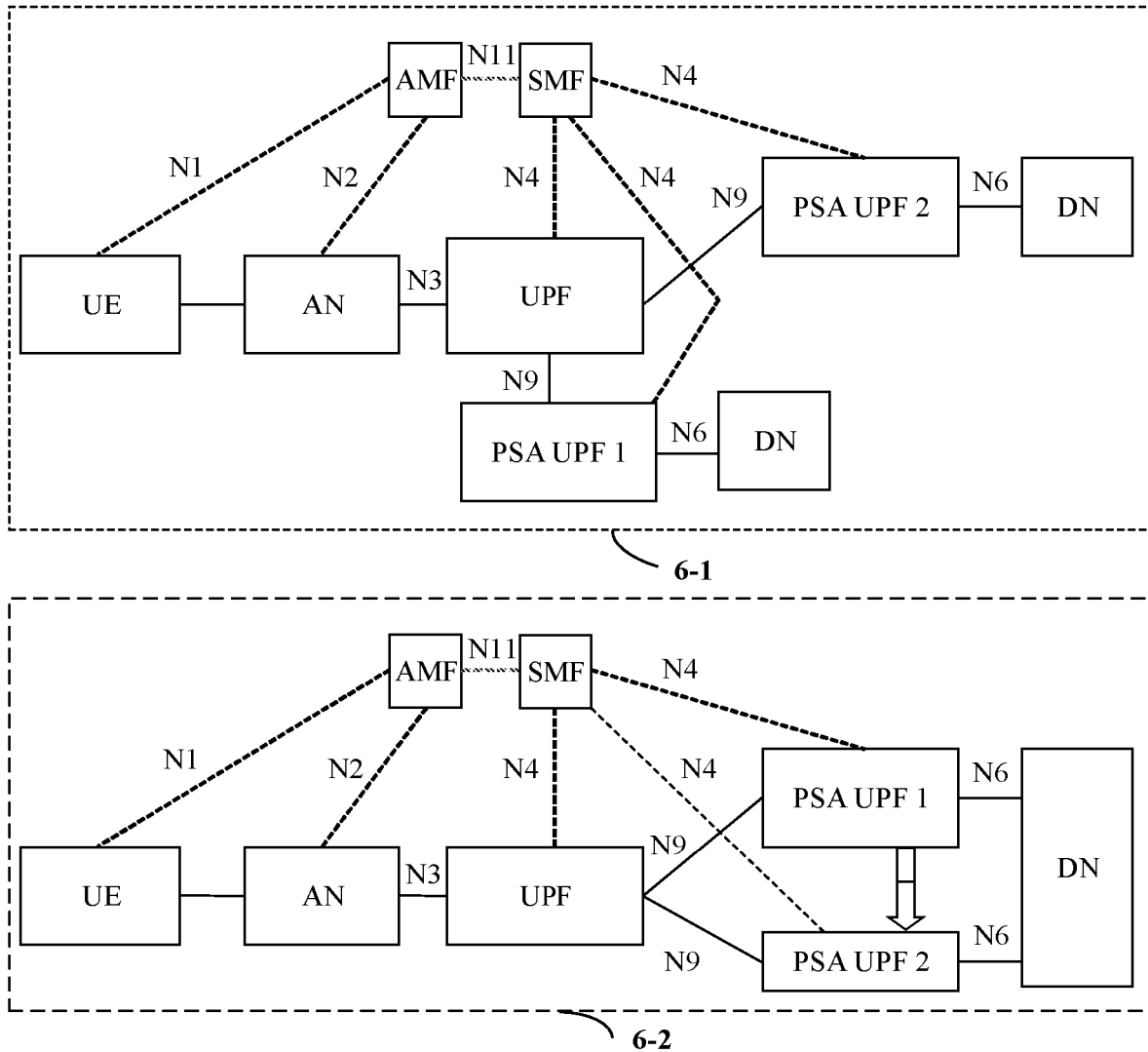
FIG. 6 is a schematic structural diagram of a multi-homed PDU session.

FIG. 6 is a schematic architectural diagram of a multi-homed PDU session. As shown in FIG. 6, an architecture 6-1 of a multi-homed PDU session with local access to a same DN (Multi-homed PDU Session: local access to same DN), and an architecture 6-2 of a multi-homed PDU session with continuity ensured (Multi-homed PDU Session: service continuity case) are included.

The multi-homed PDU session may be applied to a case in which UE needs to access both a local service (for example, a local server) and a center service (for example, the internet). Descriptions are provided by using the architecture 6-1 in FIG. 6 as an example. As shown in FIG. 6, the architecture 6-1 includes UE, an AN, an AMF, an SMF, a UPF and a DN. A UPF having a function of a branching point is connected to a PDU session anchor UPF (including a PSA UPF 1 and a PSA UPF 2). In the architecture 6-1, the UE is connected to the AMF through an interface N1; the AN is connected to the AMF through an interface N2, and is connected to the branching point UPF through an interface N3; the AMF is connected to the SMF through an interface N11; the branching point UPF is connected to the SMF through an interface N4, and is separately connected to the PSA UPF 1 and the PSA UPF 2 through interfaces N9; the SMF is separately connected to PSA UPF 1 and PSA UPF 2 through interfaces N4; the PSA UPF 1 is connected to the DN through an interface N6; the PSA UPF 2 is connected to the DN through an interface N6. Service flows in a same QoS flow may be transmitted by using a plurality of PSA UPFs. For example, in the architecture 6-1, the service flows in the same QoS flow may be transmitted by using the PSA UPF 1 and the PSA UPF 2.

The multi-homed PDU session may be applied to a make-before-break (make-before-break) service to maintain continuity of the make-before-break service, for example, an SSC mode 3. Descriptions are provided by using the architecture 6-2 in FIG. 6 as an example. As shown in FIG. 6, the architecture 6-2 includes UE, an AN, an AMF, an SMF, a UPF, and a DN. A UPF having a function of a branching point is connected to a PDU session anchor UPF (including a PSA UPF 1 and a PSA UPF 2). In architecture 6-2, the UE is connected to the AMF through an interface N1; the AN is connected to the AMF through an interface N2, and is connected to the branching point UPF through an interface N3; the AMF is connected to the SMF through an interface N11; the branching point UPF is connected to the SMF through an interface N4, and is separately connected to the PSA UPF 1 and the PSA UPF 2 through interfaces N9; the SMF is separately connected to PSA UPF 1 and PSA UPF 2 through interfaces N4; the PSA UPF 1 is connected to the DN through an interface N6; the UPF corresponding to the PSA UPF 2 is connected to the DN through an interface N6. In the architecture 6-1, a service flow in a QoS flow may be transmitted by using the PSA UPF 1. If a PSA UPF switchover is required, the PSA UPF 2 may be first established. After the PSA UPF 2 is established, the PSA UPF 1 may be removed. To ensure service continuity, normal use of the PSA UPF 1 may be maintained in a process of making the PSA UPF 2.

It should be noted that names of the network elements (such as the V-PCF, the H-PCF, the AMF, and the RAN) included in FIG. 2 to FIG. 6 are merely names, and the names constitute no limitation to functions of the network elements. In another future network, the foregoing network elements may alternatively have other names. This is not specifically limited in this embodiment of this application. For example, in a 6G network, some or all of the foregoing network elements may still use terms in 5G, or may use other names, or the like. This is uniformly described herein. Details are not described in the following.

For specific working processes and beneficial effects of the network elements in the systems in FIG. 1 to FIG. 6, refer to descriptions in the following method embodiments.

Figure 7:
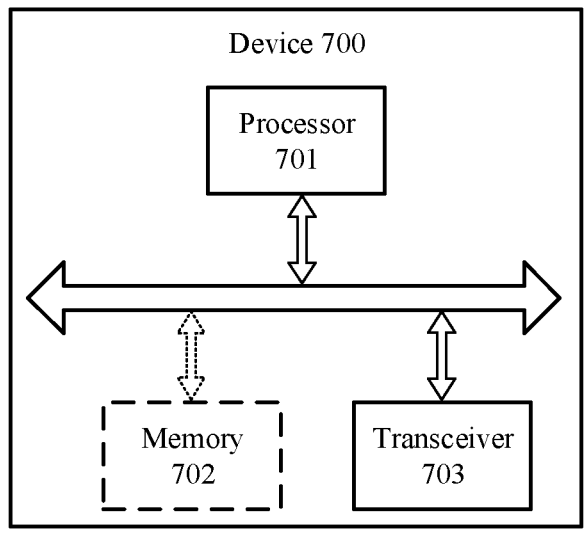
FIG. 7 is a schematic block diagram of a computer device to which an embodiment of this application is applied.

FIG. 7 is a schematic block diagram of a computer device 700 (or a packet delay parameter obtaining apparatus) to which an embodiment of this application is applied. The session management network element or the access network element in FIG. 1 may be implemented by the computer device in FIG. 7. Alternatively, the SMF in FIG. 2 to FIG. 6 may be implemented by the computer device in FIG. 7.

As shown in FIG. 7, the computer device includes a processor 701 and a transceiver 703. Optionally, the computer device may further include a memory 702. A specific deployment location of the memory 702 is not specifically limited in this embodiment of this application. The memory may be integrated into the processor, or may be independent of the processor. When the computer device does not include a memory, the computer device only needs to have a processing function, and the memory may be deployed in another location (for example, a cloud system).

The processor 701, the memory 702, and the transceiver 703 communicate with each other through an internal connection path, to transfer a control and/or data signal.

It may be understood that, although not shown, the computer device 700 may further include another apparatus, such as an input apparatus, an output apparatus, or a battery.

Optionally, in some embodiments, the memory 702 may store an executable instruction used to perform a method in the embodiments of this application. The processor 701 may execute the instruction stored in the memory 702, to complete, in combination with other hardware (for example, the transceiver 703), steps to be performed in the following methods. For specific working processes and beneficial effects, refer to descriptions in the following method embodiments.

The method disclosed in the foregoing embodiments of this application may be applied to a processor or may be implemented by a processor. The processor may be an integrated circuit chip and has a signal processing capability.

In an implementation process, steps in the foregoing methods can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and logical block diagrams that are disclosed in the embodiments of this application can be implemented. The general-purpose processor may be a microprocessor, or the processor may be any conventional processor or the like. Steps of the methods disclosed with reference to the embodiments of this application may be directly executed and accomplished by a hardware decoding processor, or may be executed and accomplished by using a combination of hardware and software modules in the decoding processor. A software module may be located in a mature storage medium in the art, such as a random access memory (random access memory, RAM), a flash memory, a read-only memory (read-only memory, ROM), a programmable read-only memory, an electrically erasable programmable memory, a register, or the like. The storage medium is located in the memory, and the processor reads instructions in the memory and performs the steps in the foregoing methods in combination with hardware of the processor.

The computer device 700 may be a general-purpose computer device or a special-purpose computer device. In a specific implementation, the computer device 700 may be a desktop computer, a portable computer, a network server, a personal digital assistant (PDA), a mobile phone, a tablet, a wireless terminal device, a communications device, an embedded device, or a device having a structure similar to that in FIG. 3. A type of the computer device 700 is not limited in this embodiment of this application.

To facilitate understanding of the technical solutions in the embodiments of this application, before the solutions in the embodiments of this application are described based on a 5G architecture, some terms or concepts in 5G that may be used in the embodiments of this application are first briefly described.

1. PDU Session

A PDU session is an association between a terminal device and a data network (DN), and is used to provide a PDU connection service.

2. QoS Parameter

A QoS parameter includes one or more of the following parameters: a 5G QoS identifier (5QI), an allocation and retention priority (ARP), a guaranteed flow bit rate (GFBR), a maximum flow bit rate (MFBR), a reflective QoS attribute (RQA), and quality of service notification control (QNC).

The 5QI is a scalar used to index to a corresponding 5G QoS characteristic. The 5QI is classified into a standardized 5QI, a preconfigured 5QI, and a dynamically allocated 5QI. Standardized 5QIs one-to-one correspond to a group of standardized 5G QoS characteristics. For a preconfigured 5QI, a corresponding 5G QoS characteristic is preconfigured on an access network element. For a dynamically allocated 5QI, a corresponding 5G QoS characteristic is sent by a core network device to an access network element by using a QoS profile.

The ARP includes a priority level, a pre-emption capability, and a pre-emption vulnerability.

The GFBR represents a bit rate that is expected to be provided to a guaranteed bit rate (GBR) QoS flow.

The MFBR is used to limit a bit rate provided to a GBR QoS flow, to be specific, a maximum bit rate provided to the GBR QoS flow. If the bit rate is exceeded, a packet can be discarded.

The RQA is used to indicate a service transmitted by using a corresponding QoS flow, to use reflective QoS.

The QNC is used to indicate whether an access network element notifies a network when a GFBR cannot be satisfied during use of a QoS flow.

3. QoS Model

In a 5G system, to ensure end-to-end service quality of a service, a 5G QoS model based on a QoS flow (flow) is proposed. The 5G QoS model supports a guaranteed bit rate QoS flow (namely, a GBR QoS flow) and a non-guaranteed bit rate QoS flow (namely, a non-GBR (non-GBR) QoS flow). Same transmission processing (such as scheduling or an admission threshold) is performed on packets controlled by a same QoS flow. A terminal device may establish one or more PDU sessions with a 5G network. One or more QoS flows can be established in each PDU session. Each QoS flow is identified by a QoS flow identifier (QFI). A QFI uniquely identifies a QoS flow in a session. In addition, each QoS flow corresponds to one data radio bearer (DRB), and a DRB may correspond to one or more QoS flows.

Whether a QoS flow is a GBR QoS flow or a non-GBR QoS flow is determined by a corresponding QoS profile.

For a GBR QoS flow, a corresponding QoS profile needs to include the following QoS parameters: a 5QI, an ARP, a GFBR, and an MFBR, and optionally includes QNC. A GBR QoS flow is classified into a GBR QoS flow that requires notification control and a GBR QoS flow that does not require notification control, depending on whether the QoS profile includes QNC. For a GBR QoS flow that requires notification control, when an access network element detects that a corresponding QoS flow resource cannot be satisfied, the access network element notifies a session management function SMF network element of the event. Further, the SMF network element may initiate a QoS flow deletion or modification procedure.

For a non-GBR QoS flow, a corresponding QoS profile needs to include the following QoS parameters: a 5QI and an ARP, and optionally includes RQA.

In addition, a GBR QoS flow is controlled mainly based on signaling, and a corresponding QoS flow establishment procedure includes the following steps: Step 1: An SMF network element determines, according to a local policy or a PCC rule sent by a PCF network element, to establish a QoS flow; in this case, (2a) service data flow (SDF) information is sent to a user plane function UPF network element, where the SDF information includes QoS control information; (2b) a QoS profile of a QoS flow is sent by an access and mobility management function AMF network element to an access network element; (2c) a QoS rule (QoS rule) is sent by the AMF network element and the access network element to a terminal device, where the QoS rule includes the QoS control information. Step 2: Establish a QoS flow between the terminal device, the access network element, and a UPF network element; the access network element establishes an air interface DRB based on the QoS profile, and stores a binding relationship between a QoS flow and a DRB.

For a downlink, when receiving a downlink packet, the UPF network element carries a QFI in a packet header of the downlink packet based on the SDF information sent by the SMF network element. When receiving the downlink packet, the access network element transmits the downlink packet on a corresponding DRB based on the QFI in the packet header and the corresponding binding relationship between a QoS flow and a DRB.

For an uplink, when determining to send an uplink packet, the terminal device determines a QoS flow according to a QoS rule, carries a QFI in a packet header of a to-be-sent uplink packet, and transmits the uplink packet on a corresponding DRB based on the binding relationship between a QoS flow and a DRB. When receiving the uplink packet, the access network element carries a QFI in a packet header of the uplink packet between the access network element and the UPF network element based on the QFI in the packet header. When receiving the uplink packet sent by the access network element, the UPF network element verifies whether the packet is transmitted by using a correct QoS flow.

4. Binding Parameter

A binding parameter may include one or more of the following: a 5QI (for related descriptions, refer to the descriptions of the foregoing QoS parameter, and details are not described herein again), an ARP (For related descriptions, refer to the descriptions of the foregoing QoS parameter, and details are not described herein again).

Alternatively, optionally, if a PCC rule includes one or more of the following parameters, the one or more of the following parameters may also be used as a binding parameter or binding parameters: QNC: For related descriptions, refer to the QoS parameter part, and details are not described herein again; a priority: The priority indicates a priority of scheduling a resource in a QoS flow (where the priority is used to distinguish between QoS flows of a same terminal device, and is further used to distinguish between QoS flows from different terminal devices); an averaging window: The averaging window is used only for a GBR QoS flow and represents duration for calculating a GFBR and an MFBR; and an MDBV: The MDBV represents a maximum data volume to be served by a 5G access network within a packet delay budget (PDB). The PDB defines an upper limit of a time for which transmission of a packet between the terminal device and a UPF network element having an interface N6 can be delayed.

Certainly, the priority, the averaging window, or a maximum data burst volume may also be a parameter in the QoS attribute corresponding to the 5QI. This is not specifically limited herein.

5. End-to-End Packet Delay Budget PDB

For a service having a low latency requirement (for example, an ultra-reliable and low-latency communications (URLLC) service), an end-to-end PDB is divided into two parts on a network side or a RAN side: a PDB on a core network side (to be specific, a PSA UPF-RAN PDB) and a PDB on an access network side (to be specific, a RAN-UE PDB). The PSA UPF-RAN PDB is referred to as "PSA-to-NG-RAN-node delay", "dynamic CN component of the PDB", or "CN PDB" in the standard, and may also be "PSA-RAN PDB" for short. For ease of description, the PSA UPF-RAN PDB is described by using the PSA-RAN PDB in the following. An access network element may perform scheduling based on the RAN-UE PDB. After selecting a UPF, a session management network element may obtain the PSA-RAN PDB based on a configuration, and then send the PSA-RAN PDB to the access network element. The access network element may derive the RAN-UE PDB based on an end-to-end PDB in a QoS profile and the PSA-RAN PDB sent by the session management network element, to perform scheduling based on the RAN-UE PDB.

To help the access network element distinguish between packet delay parameters (which may be PDBs on a core network side, for example, PSA-RAN PDBs) of service flows transmitted by different PSA UPFs, this application provides a packet delay parameter obtaining method, to allocate service flows from different PSA UPFs to different QoS flows for transmission, and send PSA-RAN PDBs corresponding to the service flows to the access network element, so that the access network element distinguishes between different PSA-RAN PDBs.

Based on the 5G architecture described in FIG. 2 to FIG. 6, the following describes a packet delay parameter obtaining method in the embodiments of this application with reference to FIG. 8 to FIG. 12. Unified description is provided herein. In the following embodiments, descriptions are provided by using an example in which a session management network element is an SMF, an access network element is a RAN, a policy control network element is a PCF, and a user plane function used to support a PDU session anchor is a PSA UPF. However, this constitutes no limitation to the protection scope of the embodiments of this application.

Figure 8:
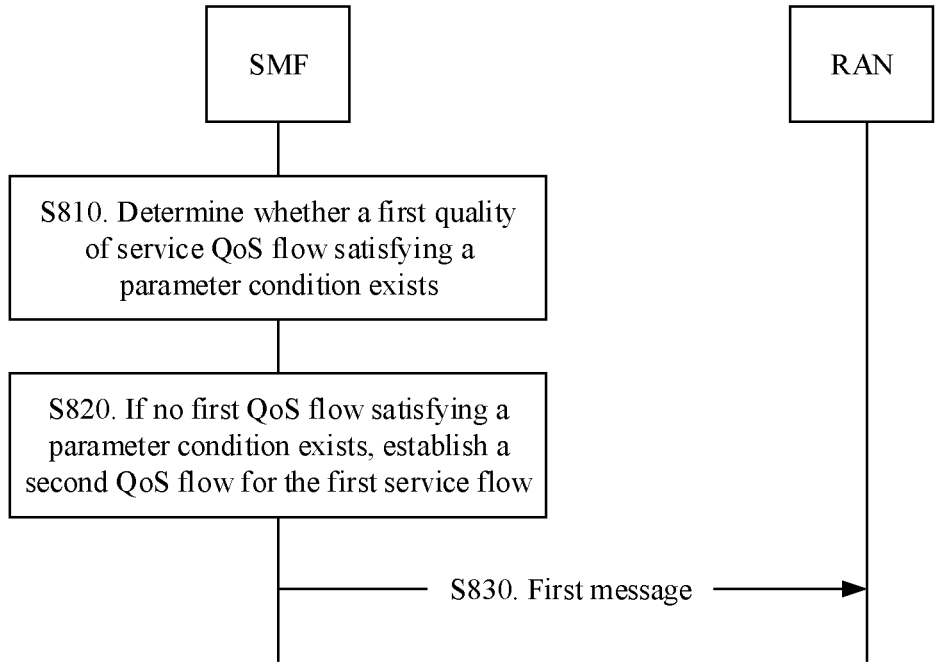
FIG. 8 is a schematic flowchart of a packet delay parameter obtaining method according to an embodiment of this application.

FIG. 8 is a schematic flowchart of a packet delay parameter obtaining method 800 according to an embodiment of this application. It should be understood that, message sending and receiving in an existing standard may be used as content of sending and receiving in an interaction procedure in FIG. 8. For a specific meaning of a message, reference may be made to descriptions in the standard. Alternatively, a newly defined message may be used for receiving and sending. This is not limited. As shown in FIG. 8, the method 800 includes the following steps.

S810. An SMF determines whether a first quality of service QoS flow satisfying a parameter condition exists, where the parameter condition means that a first parameter of the first QoS flow is identical to a first parameter of a first service flow, the first parameter of the first QoS flow is used to indicate information corresponding to a protocol data unit session anchor PSA user plane function UPF transmitting the first QoS flow, and the first parameter of the first service flow is used to indicate information corresponding to a PSA UPF transmitting the first service flow.

The first PSA UPF is a UPF that supports a PDU session anchor function.

In an implementation, the first parameter is a packet delay parameter. Correspondingly, the parameter condition means that a packet delay parameter of the first QoS flow is identical to a packet delay parameter of the first service flow.

Herein, the packet delay parameter may be used by the RAN to determine a session anchor radio access network PSA-RAN packet delay budget PDB. In other words, after obtaining the packet delay parameter, the RAN may determine the PSA-RAN PDB through calculation.

Optionally, the packet delay parameter is a protocol data unit session anchor radio access network PSA-RAN packet delay budget PDB. In this way, the RAN can directly obtain the PSA-RAN PDB.

In another implementation, the first parameter is a data network access identifier DNAI. Correspondingly, the parameter condition means that a DNAI of the first QoS flow is identical to a DNAI of the first service flow.

Optionally, the SMF may determine, based on a resource type of a 5QI, whether to detect whether the first QoS flow satisfying the parameter condition exists. If the resource type of the 5QI is a delay critical guaranteed bit rate resource type (Delay critical GBR), the SMF determines to detect whether the first QoS flow satisfying the parameter condition exists.

S820. If no first QoS flow satisfying the parameter condition exists, the SMF establishes a second QoS flow for the first service flow.

Optionally, if the first QoS flow satisfying the parameter condition exists, the SMF binds the first service flow to the first QoS flow for transmission.

In other words, if a QoS flow with the same first parameter exists, the SMF may bind the first service flow to the established QoS flow (for example, the first QoS flow) for transmission. If no QoS flow with the same first parameter exists, the SMF needs to newly establish or allocate a QoS flow (for example, the second QoS flow, where the second QoS flow is different from the first QoS flow) for the first service flow, and the newly established or allocated QoS flow has corresponding QoS flow identification information, for example, a QFI.

S830. The SMF sends a first message to the RAN, where the first message includes identification information of the second QoS flow and a packet delay parameter corresponding to the second QoS flow.

In other words, after establishing the second QoS flow, the SMF may send the first message to the RAN. The first message includes a QFI of the second QoS flow and the packet delay parameter corresponding to the second QoS flow. In this way, the RAN can obtain the PSA-RAN PDB of the first service flow based on the packet delay parameter of the second QoS flow, to distinguish between PSA-RAN PDBs of service flows transmitted by different PSA UPFs. It should be understood that, whether service flows transmitted by different PSA UPFs are from a same QoS flow is not limited in this embodiment of this application. Regardless of whether the service flows are from the same QoS flow, the packet delay parameter obtaining method in this embodiment of this application is applicable. For example, when service flows are transmitted by different PSA UPFs in a same QoS flow, if a conventional technology is used, the same QoS flow has a plurality of different packet delay parameters. After these packet delay parameters are transferred to the RAN, the RAN cannot identify a specific packet delay parameter corresponding to a service flow transmitted by a corresponding PSA UPF. However, if the packet delay parameter obtaining method in this embodiment of this application is used, for service flows that are in a same QoS flow and that are transmitted by different PSA UPFs, different QoS flows may be established for the service flows transmitted by the different PSA UPFs. Each QoS flow has a corresponding packet delay parameter. In this way, the RAN can learn of a specific packet delay parameter corresponding to a corresponding service flow, that is, the RAN can distinguish between the packet delay parameters of the service flows that are in the same QoS flow and that are transmitted by the different PSA UPFs.

Optionally, the SMF may send the first message to the RAN in a PDU session establishment process, or may send the first message to the RAN in a PDU session modification procedure. This is not limited.

Specifically, the SMF may send the first message to a mobility management network element, and the mobility management network element forwards the first message to the RAN. For example, the first message may be N2 SM information, and the N2 SM information carries the QFI and the PSA-RAN PDB.

Optionally, before determining whether the first QoS flow satisfying the parameter condition exists, the SMF needs to first obtain the first parameter of the first service flow. The following provides descriptions with reference to different scenarios.

In an embodiment, when inserting a new PSA UPF, the SMF may obtain the first parameter of the first service flow. Optionally, the method 800 further includes:

when inserting a first PSA UPF, the SMF determines the first parameter of the first service flow, where the first PSA UPF is configured to transmit the first service flow.

Optionally, the SMF may select a plurality of PSA UPFs when a PDU session is established, or may insert a new PSA UPF after a PDU session is established. This is not limited.

Specifically, when the SMF inserts a new PSA UPF (for example, the first PSA UPF) in the PDU session, the first PSA UPF is configured to transmit the first service flow, and the SMF may obtain the first parameter of the first service flow, for example, the PSA-RAN PDB. Then, the SMF may detect whether QoS flows with a same first parameter exist in existing QoS flows. If no QoS flow with the same first parameter exists in the existing QoS flows, the SMF creates the second QoS flow for the first service flow, and allocates a new QFI.

It is assumed that the first parameter is a packet delay parameter. How the SMF determines the packet delay parameter of the first service flow is briefly described herein.

The SMF manages the plurality of PSA UPFs. The SMF may configure, for all PSA UPFs within a service range based on a rate requirement of a service (for example, the rate may be determined based on a resource type corresponding to a 5QI parameter), a packet delay parameter to be sent to the RAN, for example, a PSA-RAN PDB. Optionally, a resource type corresponding to the 5QI parameter may be a delay critical GBR resource type. Herein, in a scenario in which both the PSA UPF and the RAN are identical (which may be understood as that a start network element and an end network element of a path are identical), if paths between the PSA UPF and the RAN are different, packet delay parameters from the PSA UPF to the RAN are also different. In this scenario, the SMF also needs to configure the packet delay parameters.

Figure 9:
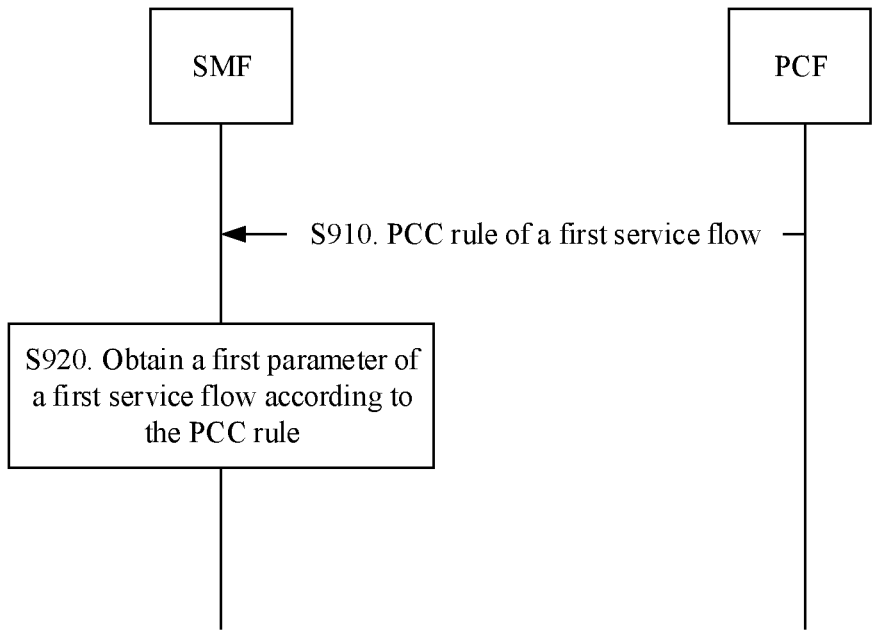
FIG. 9 is a schematic interaction diagram of obtaining a first parameter by a session management network element.

In another embodiment, when receiving a new PCC rule, the SMF may obtain the first parameter. FIG. 9 is a schematic interaction diagram of obtaining a first parameter by an SMF. As shown in FIG. 9, the method includes the following steps.

S910. A PCF sends a policy and charging control PCC rule of a first service flow to an SMF, where the PCC rule includes a first parameter of the first service flow. Correspondingly, the SMF receives the PCC rule of the first service flow from the PCF.

Optionally, the PCC rule of the first service flow may be a new PCC rule delivered by the PCF, or may be a PCC rule obtained by modifying an existing PCC rule (where the existing PCC rule is a PCC rule that has been delivered by the PCF). This is not limited.

S920. The SMF obtains the first parameter of the first service flow according to the PCC rule.

In other words, the SMF can obtain the first parameter of the first service flow from the PCC rule of the first service flow. Herein, the first parameter obtained by the SMF may include the binding parameter described above. Compared with the binding parameter described above, in this embodiment of this application, a "data network access identifier (DN access identifier, DNAI)" may be further added to the binding parameter. Herein, the DNAI may be understood as an identifier or identifiers of one or more DNs deployed for a user plane to access an application. Specifically, the first parameter includes a 5QI, an ARP, QNC, a priority, an averaging window, an MDBV, and a DNAI.

It is assumed that the first parameter includes the following binding parameters: other binding parameters such as a 5QI, an ARP, and a DNAI (for example, the other binding parameters may include QNC, a priority, an averaging window, and an MDBV). Correspondingly, the parameter condition is that all binding parameters (other binding parameters such as a 5QI, an ARP, and a DNAI) of the first QoS flow are identical to all binding parameters (other binding parameters such as a 5QI, an ARP, and a DNAI) of the first service flow. In other words, the SMF can detect whether the first QoS flow exists in existing QoS flows, where all the binding parameters of the first QoS flow are identical to all the binding parameters of the first service flow. If the first QoS flow whose binding parameters are identical to those of the first service flow exists, the first service flow may be bound to the first QoS flow; if no first QoS flow whose binding parameters are identical to those of the first service flow exists, a second QoS flow is established. Binding parameters of the second QoS flow are obtained from the PCC rule.

Therefore, in the another embodiment, when receiving the PCC rule of the first service flow, the SMF may obtain the first parameter of the first service flow, and then perform the method 800, thereby helping the RAN distinguish between PSA-RAN PDBs of service flows transmitted by different PSA UPFs.

Optionally, the SMF may use, as a binding parameter, another parameter that can be used to distinguish between the service flows transmitted by the different PSA UPFs, for example, an application IP address (including a destination IP address/prefix of downlink data and a source IP address/prefix of uplink data). This is not limited.

Optionally, the SMF may use tunnel ID information of a tunnel used to transmit a service flow, as the first parameter. For example, the tunnel used to transmit the service flow may be a tunnel N6 (where the tunnel N6 may be understood as a tunnel between a PSA UPF and a DN), and different tunnels N6 correspond to different PSA UPFs. Alternatively, the tunnel may be a tunnel N9 (where the tunnel N9 may be understood as a tunnel between a PSA UPF and a UPF (which may be the UPF having the function of the uplink classifier in FIG. 5 or the UPF having the branching function in FIG. 6)). A distinguishment between different service flows can be made by a filter (filter) or an SDF template (template). The SMF manages a plurality of PSA UPFs and can establish tunnels with the plurality of PSA UPFs. Each tunnel corresponds to tunnel ID information. The SMF may transmit the service flows by using the plurality of PSA UPFs.

Alternatively, the SMF may use data flow filter information such as a source IP address/prefix, a destination IP address/prefix, and a port number as the first parameter. Herein, meanings of the source IP address/prefix and the destination IP address/prefix of the uplink data are different from those of the downlink data. Specifically, for the downlink data, a destination IP address/prefix of the downlink data is an address/a prefix of UE, and the source address/prefix is an address/a prefix of an external application (a server). For the uplink data, a destination IP address/prefix of the uplink data is an address/a prefix of an external application (a server), and the source address/prefix is an address/a prefix of UE.

Figure 10:
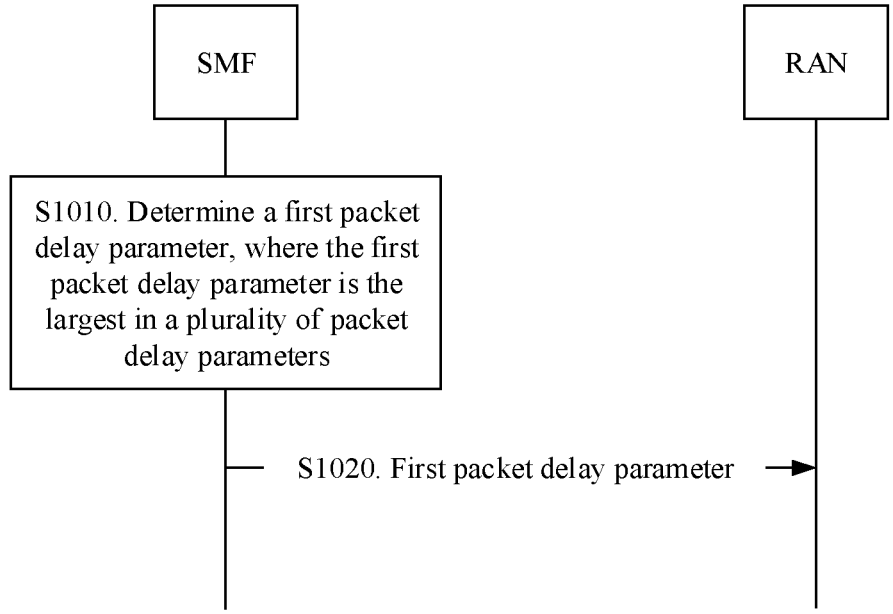
FIG. 10 is a schematic interaction diagram of a packet delay parameter obtaining method according to another embodiment of this application.

This application further provides another packet delay parameter obtaining method. A largest PSA-RAN PDB is selected by comparing a plurality of PSA-RAN PDBs, and the largest PSA-RAN PDB is sent to the RAN. FIG. 10 is a schematic interaction diagram of a packet delay parameter obtaining method 1000 according to another embodiment of this application. As shown in FIG. 10, the method 1000 includes the following steps.

S1010. An SMF determines a first packet delay parameter, where the first packet delay parameter is the largest in a plurality of packet delay parameters, and the plurality of packet delay parameters are packet delay parameters of service flows that are simultaneously transmitted in a same quality of service QoS flow by a plurality of protocol data unit session anchor PSA user plane functions UPFs.

S1020. The SMF sends the first packet delay parameter to a RAN. Correspondingly, the RAN receives the first packet delay parameter.

In other words, the SMF can compare the plurality of packet delay parameters based on a local configuration, and then select a largest packet delay parameter and transfer the largest packet delay parameter to the RAN, that is, the SMF send a longest upper time limit to the RAN, to ensure a latency requirement of a service flow.

Herein, the local configuration refers to a plurality of packet delay parameters configured by the SMF. Specifically, the SMF manages a plurality of PSA UPFs. The SMF may configure, for each of all PSA UPFs within a service range based on a rate requirement of a service (for example, the rate may be determined based on a resource type corresponding to a 5QI parameter), a packet delay parameter to be sent to the RAN, for example, a PSA-RAN PDB. Optionally, a resource type corresponding to the 5QI parameter may be a delay critical GBR resource type. Herein, in a scenario in which both the PSA UPF and the RAN are identical (which may be understood as that a start network element and an end network element of a path are identical), if paths between the PSA UPF and the RAN are different, packet delay parameters from the PSA UPF to the RAN are also different. In this scenario, the SMF also needs to configure the packet delay parameters.

Specifically, the first packet delay parameter may be carried in an existing message (a message in a PDU session establishment procedure or a message in a PDU session modification procedure), for example, N2 SM information.

That the SMF sends the first packet delay parameter to a RAN includes: The SMF may first send, to a mobility management network element, the N2 SM information carrying the first packet delay parameter, and then the mobility management network element forwards, to the RAN, the N2 SM information carrying the first packet delay parameter.

Similarly, the packet delay parameter may be used by the RAN to determine a session anchor radio access network PSA-RAN packet delay budget PDB. In other words, after obtaining the packet delay parameter, the RAN may determine the PSA-RAN PDB through calculation.

Optionally, the packet delay parameter is a protocol data unit session anchor radio access network PSA-RAN packet delay budget PDB. In this way, the RAN can directly obtain the PSA-RAN PDB.

When a new PSA UPF is inserted, or a cell handover occurs on UE, a plurality of original packet delay parameters (for example, PSA-RAN PDBs) may change. Consequently, a largest packet delay parameter changes. In this case, the first packet delay parameter shall be updated. Optionally, the method 1000 further includes: The SMF determines whether the first packet delay parameter is updated; and if the first packet delay parameter is updated, the SMF sends an updated first packet delay parameter to the RAN.

That is, when the new PSA UPF is inserted, or the cell handover occurs on the UE, the SMF may determine whether the largest packet delay parameter is updated; and if the maximum packet delay parameter is updated, the updated first packet delay parameter needs to be sent to the RAN, to ensure that the RAN can synchronously obtain a latest largest packet delay parameter.

This application further provides an embodiment. In this embodiment, a user plane function UPF may add identification information to a downlink packet, and the identification information is used by a RAN to identify a packet delay parameter of the downlink packet.

Figure 11:
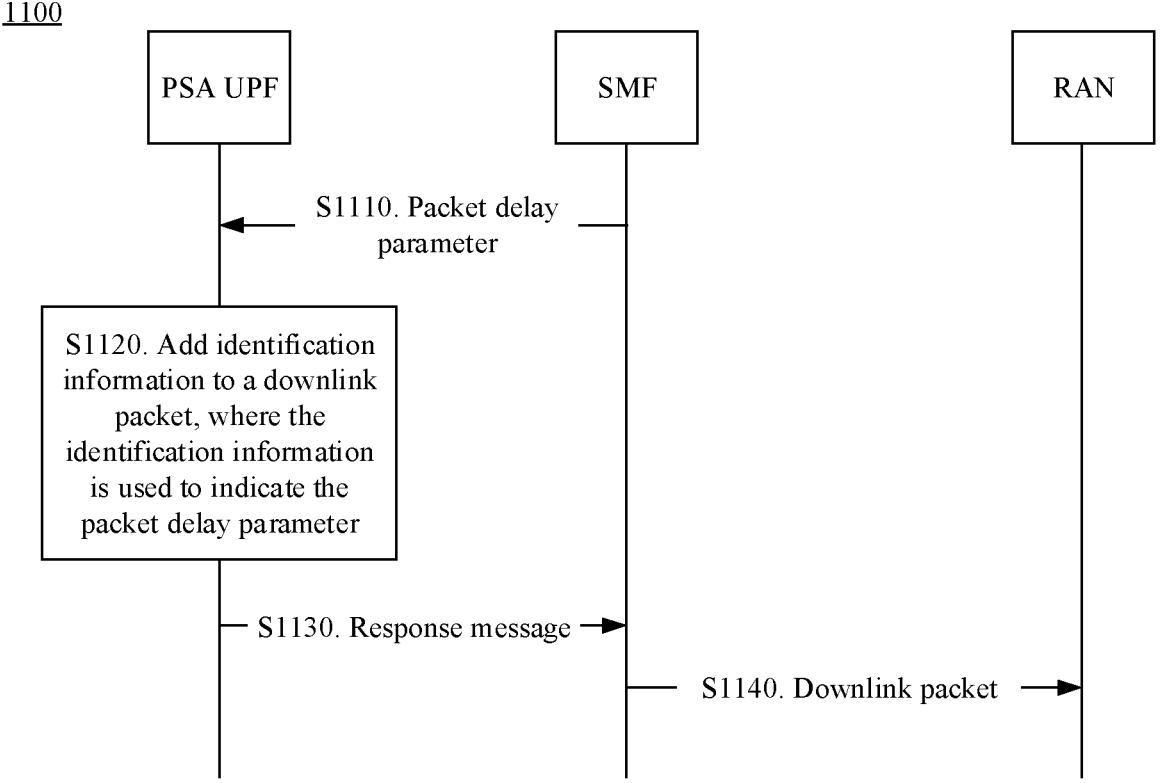
FIG. 11 is a schematic interaction diagram of a packet delay parameter obtaining method according to still another embodiment of this application.

FIG. 11 is a schematic interaction diagram of a packet delay parameter obtaining method 1100 according to still another embodiment of this application. As shown in FIG. 11, the method 1100 includes the following steps.

S1110. An SMF sends a packet delay parameter to a protocol data unit session anchor PSA user plane function UPF. Correspondingly, the PSA UPF receives the packet delay parameter.

Optionally, the SMF sends the packet delay parameter to the PSA UPF when triggering PDU session establishment, or may send the packet delay parameter to the PSA UPF (the PSA UPF is a PSA UPF obtained after replacement) when triggering UPF replacement.

For example, the SMF may send an N4 session establishment request (N4 session establishment request) to the PSA UPF, and the N4 session establishment request includes service flow description information (for example, an SDF filter) and a PSA UPF-RAN PDB corresponding to the service flow.

S1120. The PSA UPF adds identification information to a downlink packet, where the identification information is used to indicate the packet delay parameter.

Figure 12:
FIG. 12 is an schematic diagram of components of a downlink packet according to an embodiment of this application.

Specifically, the PSA UPF may mark the downlink packet, and add the packet delay parameter. FIG. 12 is a schematic diagram of a packet to which identification information is added. FIG. 12 is the schematic diagram of the packet according to this embodiment of this application. As shown in FIG. 12, the packet includes: a UE IP address/prefix (which may be, for example, an IPv6 prefix), a PSA-RAN PDB, and other content of the packet. In other words, compared with an existing packet, in the packet in FIG. 12, the PSA-RAN PDB is added.

S1130. The PSA UPF sends a response message to the SMF. Correspondingly, the SMF receives the response message. The response message is used to respond to the N4 session establishment request. For example, the response message may be an N4 session establishment response.

For example, the response message may be an N4 session response message returned by the PSA UPF to the SMF.

S1140. The SMF sends the downlink packet to a RAN, where the downlink packet carries the identification information. Correspondingly, the RAN receives the downlink packet.

That the SMF sends the downlink packet to the RAN includes: The SMF may send the downlink packet to a mobility management network element, and then the mobility management network element sends the downlink packet to the RAN.

Specifically, when PDU session establishment is triggered or the PSA UPF is changed, the SMF sends the packet delay parameter to a PSA UPF. After receiving the packet delay parameter, the PSA UPF may add identification information to the downlink packet, and reply the SMF with a response message. The identification information is used to indicate the packet delay parameter. The SMF may send, to the RAN, the downlink packet that carries the identification information, so that the RAN obtains the packet delay parameter based on the identification information, and can obtain a delay parameter corresponding to a user plane packet of the service flow. This helps the RAN distinguish between packet delay parameters of different service flows.

The foregoing describes the manner of adding the identification information to the downlink packet, and the following describes a manner of processing an uplink packet. Optionally, for an uplink packet, the UE may add identification information to the uplink packet based on a source IP address/prefix. The identification information is used to indicate a packet delay parameter (for example, a PSA RAN PDB). Alternatively, identification information may be added to an uplink packet corresponding to a downlink packet received on a user plane. Alternatively, optionally, the UE may obtain a correspondence sent by the SMF, where the correspondence is a correspondence between an IP address/prefix and a packet delay parameter. Then the UE adds identification information to a corresponding uplink packet.

For example, a downlink packet includes an IP address/prefix, a PSA-RAN PDB, and other content of the packet. After receiving the downlink packet, the UE may derive a destination IP address/prefix of a corresponding uplink packet based on the IP address/prefix of the downlink packet, and obtain a PSA-RAN PDB based on the downlink packet. During packet assembly, the destination IP address/prefix and the PSA-RAN PDB are used for packet assembly, and other content of the packet is filled.

Therefore, regardless of a downlink packet and an uplink packet, identification information may be added to a packet by using the method in this embodiment of this application, to indicate a corresponding packet delay parameter.

It should be understood that the solutions in the embodiments of this application may be combined, and explanations or descriptions of the terms in the embodiments may be cited or explained in the embodiments. This is not limited.

The foregoing describes the packet delay parameter obtaining method, and the following describes a packet delay parameter obtaining apparatus according to an embodiment of this application. It should be understood that the technical features described in the method embodiments are also applicable to the following apparatus embodiments.

Figure 13:
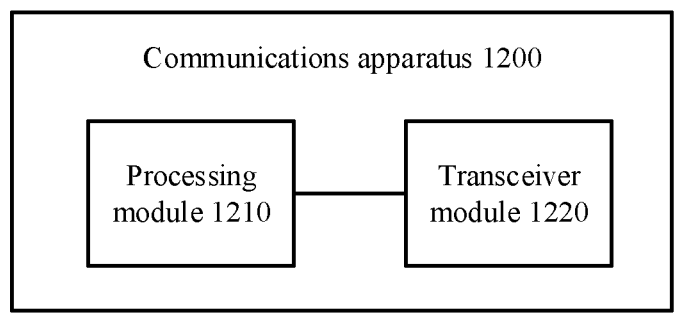
FIG. 13 is a schematic block diagram of a packet delay parameter obtaining apparatus according to an embodiment of this application.

FIG. 13 is a schematic block diagram of a packet delay parameter obtaining apparatus 1200 according to an embodiment of this application. Optionally, a specific form of the communications apparatus 1200 may be a general-purpose computer device or a chip in a general-purpose computer device. This is not limited in this embodiment of this application. The communications apparatus 1200 is a session management network element or a chip in a session management network element.

In an implementation, the communications apparatus 1200 includes: a processing module 1210, configured to determine whether a first quality of service QoS flow satisfying a parameter condition exists, where the parameter condition means that a first parameter of the first QoS flow is identical to a first parameter of a first service flow, the first parameter of the first QoS flow is used to indicate information corresponding to a protocol data unit session anchor PSA user plane function UPF transmitting the first QoS flow, and the first parameter of the first service flow is used to indicate information corresponding to a PSA UPF transmitting the first service flow; where the processing module 1210 is further configured to: if no first QoS flow satisfying the parameter condition exists, establish a second QoS flow for the first service flow; and a transceiver module 1220, configured to send a first message to an access network element, where the first message includes identification information of the second QoS flow and a packet delay parameter corresponding to the second QoS flow.

In a possible implementation, the first parameter is a packet delay parameter, and correspondingly, the parameter condition means that a packet delay parameter of the first QoS flow is identical to a packet delay parameter of the first service flow.

Optionally, the packet delay parameter is a protocol data unit session anchor radio access network PSA-RAN packet delay budget PDB.

In a possible implementation, the first parameter is a data network access identifier DNAI, and correspondingly, the parameter condition means that a DNAI of the first QoS flow is identical to a DNAI of the first service flow.

In a possible implementation, the processing module 1210 is further configured to: when inserting a first PSA UPF, determine the first parameter of the first service flow. The first PSA UPF is configured to transmit the first service flow.

In a possible implementation, the transceiver module 1220 is further configured to receive a policy and charging control PCC rule of the first service flow from a policy control network element. The PCC rule includes the first parameter of the first service flow. Correspondingly, the processing module 1210 is configured to obtain the first parameter of the first service flow according to the PCC rule.

Optionally, the processing module 1210 is further configured to: if the first QoS flow satisfying the parameter condition exists, bind the first service flow to the first QoS flow for transmission.

It should be understood that the packet delay parameter obtaining apparatus 1200 according to this embodiment of this application may correspond to the method performed by the session management network element in the foregoing method embodiment. In addition, the modules in the communications apparatus 1200 perform the foregoing and other management operations and/or functions to implement corresponding steps of the method performed by the session management network element in the foregoing method embodiments (for example, the method 800 or the method 900). Therefore, beneficial effects of the foregoing method embodiment can also be implemented. For brevity, details are not described herein.

In another implementation, the apparatus 1200 may further perform a packet delay parameter obtaining method according to another embodiment of this application. Details are as follows: A processing module 1210 is configured to determine a first packet delay parameter, where the first packet delay parameter is the largest in a plurality of packet delay parameters, and the plurality of packet delay parameters are packet delay parameters of service flows that are simultaneously transmitted in a same quality of service QoS flow by a plurality of protocol data unit session anchor PSA user plane functions UPFs. A transceiver module 1220 is configured to send the first packet delay parameter to an access network element.

In a possible implementation, the processing module 1210 is further configured to: determine, by the session management network element, whether the first packet delay parameter is updated. Correspondingly, the transceiver module 1220 is further configured to: if the first packet delay parameter is updated, send an updated first packet delay parameter to the access network element.

Optionally, the packet delay parameter is a protocol data unit session anchor radio access network PSA-RAN packet delay budget PDB.

It should be understood that the packet delay parameter obtaining apparatus 1200 according to this embodiment of this application may correspond to the method performed by the session management network element in the foregoing method embodiment. In addition, the modules in the communications apparatus 1200 perform the foregoing and other management operations and/or functions to implement corresponding steps of the method performed by the session management network element in the foregoing method embodiment (for example, the method 1000). Therefore, beneficial effects of the foregoing method embodiment can also be implemented. For brevity, details are not described herein.

It should also be understood that in this embodiment, the communications apparatus 1200 is presented in a form of a functional module. The "module" herein may be an application-specific integrated circuit ASIC, a circuit, a processor and a memory that execute one or more software or firmware programs, an integrated logic circuit, and/or another component that can provide the foregoing functions. In a simple embodiment, a person skilled in the art may figure out that the apparatus 1200 may be in a form shown in FIG. 7. The processing module 1220 may be implemented by the processor 701 shown in FIG. 7. Optionally, if the computer device shown in FIG. 7 includes the memory 702, the processing module 1220 may be implemented by the processor 701 and the memory 702. The transceiver module 1210 may be implemented by the transceiver 703 shown in FIG. 7. Specifically, the processor is implemented by executing a computer program stored in the memory. Optionally, when the apparatus 1200 is a chip, a function and/or an implementation process of the transceiver module 1210 may alternatively be implemented by a pin, a circuit, or the like. Optionally, the memory may be a storage unit in the chip, such as a register or a cache. The storage unit may alternatively be a storage unit that is in the computer device and that is located outside the chip, for example, the memory 702 shown in FIG. 7, or may be a storage unit that is deployed in another system or device but not located in the computer device. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. The person skilled in the art may use different methods to implement the described functions for each particular application, but it should not be considered that the implementation goes beyond the scope of this application.

Aspects or features of this application may be implemented as a method, an apparatus or a product that uses standard programming and/or engineering technologies. The term "product" used in this application covers a computer program that can be accessed from any computer readable component, carrier or medium. For example, the computer-readable medium may include but is not limited to a magnetic storage component (for example, a hard disk, a floppy disk or a magnetic tape), an optical disc (for example, a compact disc (CD), a digital versatile disc (DVD), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel and various other media that can store, include, and/or carry instructions and/or data.

It should be understood that sequence numbers of the foregoing processes do not mean execution sequences in the embodiments of this application. The execution sequences of the processes shall be determined based on functions and internal logic of the processes, and shall not be construed as any limitation to the implementation processes of the embodiments of this application.

It should be further understood that numbers "first", "second", and the like are introduced in the embodiments of this application only to distinguish between different objects, for example, distinguish between different QoS flows, and constitute no limitation to this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

Unless otherwise specified, an expression used in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. The foregoing uses three elements A, B, and C as an example to describe an optional case of the item. When an expression is "the item includes at least one of the following: A, B, . . . , and X", in other words, more elements are included in the expression, a case to which the item is applicable may also be obtained according to the foregoing rule.

The person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. The person skilled in the art may use different methods to implement the described functions for each particular application, but it should not be considered that the implementation goes beyond the scope of this application.

It may be clearly understood by the person skilled in the art that, for the purpose of convenient and brief description, for a specific working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one place, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or a part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A packet delay parameter obtaining method, comprising:
   determining, by the session management network element, whether a first quality of service (QoS) flow satisfies a parameter condition that a first parameter of the first QoS flow is identical to a first parameter of a first service flow, the first parameter of the first QoS flow indicating information corresponding to a protocol data unit session anchor (PSA) user plane function (UPF) transmitting the first QoS flow and corresponding to a PSA UPF transmitting the first service flow;
   establishing, by the session management network element, a second QoS flow for the first service flow when the first QoS flow does not satisfy the parameter condition; and
   sending, by the session management network element, a first message to an access network element, wherein the first message comprises identification information of the second QoS flow and a packet delay parameter corresponding to the second QoS flow.

2. The method according to claim 1, wherein the first parameter of the first QoS flow is a packet delay parameter, and the parameter condition indicates that a packet delay parameter of the first QoS flow is identical to a packet delay parameter of the first service flow.

3. The method according to claim 2, wherein the packet delay parameter is a protocol data unit session anchor radio access network (PSA-RAN) packet delay budget (PDB).

4. The method according to claim 1, wherein the first parameter comprises a data network access identifier (DNAI), and the parameter condition indicates that a DNAI of the first QoS flow is identical to a DNAI of the first service flow.

5. The method according to claim 1, further comprising:
when inserting a first PSA UPF, determining, by the session management network element, the first parameter of the first service flow, wherein the first PSA UPF is configured to transmit the first service flow.

6. The method according to claim 1, further comprising:
receiving, by the session management network element, a policy and charging control (PCC) rule of the first service flow from a policy control network element, wherein the PCC rule comprises the first parameter of the first service flow; and
obtaining, by the session management network element, the first parameter of the first service flow according to the PCC rule.

7. The method according to claim 1, further comprising:
binding, by the session management network element, the first service flow to the first QoS flow for transmission when the first QoS flow satisfies the parameter condition.

8. The method according to claim 1, wherein the method further comprises:
receiving, by the access network element, the first message from the session management network element.

9. A packet delay parameter obtaining system, comprising:
a session management network element configured to determine whether a first quality of service (QoS) flow satisfies a parameter condition that a first parameter of the first QoS flow is identical to a first parameter of a first service flow, the first parameter of the first QoS flow indicating information corresponding to a protocol data unit session anchor (PSA) user plane function (UPF) transmitting the first QoS flow and corresponding to a PSA UPF transmitting the first service flow, and if no first QoS flow satisfying the parameter condition exists, establish a second QoS flow for the first service flow; and
an access network element, configured to receive a first message from the session management network element, the first message comprising identification information of the second QoS flow and a packet delay parameter corresponding to the second QoS flow.

10. The packet delay parameter obtaining system according to claim 9, wherein the first parameter of the first QoS flow is a packet delay parameter, and the parameter condition indicates that a packet delay parameter of the first QoS flow is identical to a packet delay parameter of the first service flow.

11. The packet delay parameter obtaining system according to claim 9, wherein the packet delay parameter is a protocol data unit session anchor radio access network (PSA-RAN) packet delay budget (PDB).

12. The packet delay parameter obtaining system according to claim 9, wherein the first parameter comprises a data network access identifier (DNAI), and the parameter condition indicates that a DNAI of the first QoS flow is identical to a DNAI of the first service flow.

13. The packet delay parameter obtaining system according to claim 9, wherein the session management network element is configured to determine the first parameter of the first service flow when inserting a first PSA UPF, the first PSA UPF being configured to transmit the first service flow.

14. The packet delay parameter obtaining system according to claim 9, wherein
the session management network element is configured to receive a policy and charging control (PCC) rule of the first service flow from a policy control network element, the PCC rule comprising the first parameter of the first service flow, the session management network element being configured to obtain the first parameter of the first service flow according to the PCC rule.

15. The packet delay parameter obtaining system according to claim 9, wherein
the session management network element is configured to bind the first service flow to the first QoS flow for transmission when the first QoS flow satisfies the parameter condition.

16. A packet delay parameter obtaining apparatus, comprising:
at least one processor; and
a non-transitory computer computer-readable storage medium coupled to the at least one processor and configured to store instructions that, when executed, cause the packet delay parameter obtaining apparatus to:
determine whether a first quality of service (QoS) flow satisfies a parameter condition that a first parameter of the first QoS flow is identical to a first parameter of a first service flow, the first parameter of the first QoS flow indicating information corresponding to a protocol data unit session anchor (PSA) user plane function (UPF) transmitting the first QoS flow corresponding to a PSA UPF transmitting the first service flow;
establish a second QoS flow for the first service flow when the first QoS flow satisfies the parameter condition; and
send a first message to an access network element, the first message comprising identification information of the second QoS flow and a packet delay parameter corresponding to the second QoS flow.

17. The apparatus according to claim 16, wherein the first parameter is a packet delay parameter and, the parameter condition indicates that a packet delay parameter of the first QoS flow is identical to a packet delay parameter of the first service flow.

18. The apparatus according to claim 16, wherein the packet delay parameter is a protocol data unit session anchor radio access network (PSA-RAN) packet delay budget (PDB).

19. The apparatus according to claim 16, wherein the first parameter comprises a data network access identifier (DNAI) and the parameter condition indicates that a DNAI of the first QoS flow is identical to a DNAI of the first service flow.

20. The apparatus according to claim 16, wherein the at least one processor is configured to execute the instructions to cause the packet delay parameter obtaining apparatus to:
bind the first service flow to the first QoS flow for transmission when the first QoS flow satisfying the parameter condition exists.

* * * * *